US010560605B2

United States Patent
Andersen

(10) Patent No.: US 10,560,605 B2
(45) Date of Patent: Feb. 11, 2020

(54) THREE DIMENSIONAL, HUE-PLANE PRESERVING AND DIFFERENTIABLE QUASI-LINEAR TRANSFORMATION METHOD FOR COLOR CORRECTION

(71) Applicant: VisioTrue IVS, Gentofte (DK)

(72) Inventor: Casper Find Andersen, Gentofte (DK)

(73) Assignee: VisioTrue IVS, Gentofte (DK)

( * ) Notice: Subject to any disclaimer, the term of this patent is extended or adjusted under 35 U.S.C. 154(b) by 153 days.

(21) Appl. No.: 15/539,643

(22) PCT Filed: Dec. 25, 2015

(86) PCT No.: PCT/DK2015/000054
§ 371 (c)(1),
(2) Date: Jun. 23, 2017

(87) PCT Pub. No.: WO2016/101951
PCT Pub. Date: Jun. 30, 2016

(65) Prior Publication Data
US 2017/0359487 A1   Dec. 14, 2017

(30) Foreign Application Priority Data

Dec. 25, 2014   (DK) .................................. 2014 00757
Sep. 19, 2015   (DK) .................................. 2015 00548

(51) Int. Cl.
*H04N 1/64*   (2006.01)
*H04N 1/60*   (2006.01)
*G06F 17/18*   (2006.01)

(52) U.S. Cl.
CPC ........... *H04N 1/6005* (2013.01); *G06F 17/18* (2013.01); *H04N 1/6008* (2013.01); *H04N 1/6025* (2013.01)

(58) Field of Classification Search
CPC .. H04N 1/6005; H04N 1/6008; H04N 1/6025; G06F 17/18
See application file for complete search history.

(56) References Cited

U.S. PATENT DOCUMENTS 5,398,124 A  *  3/1995  Hirota ..................... H04N 1/58
                                                358/501
2007/0091337 A1 *  4/2007  Morovic .............. H04N 1/6058
                                                358/1.9

(Continued)

FOREIGN PATENT DOCUMENTS

CN   104601858 A   5/2015
DK   200500666 A   5/2006

(Continued)

OTHER PUBLICATIONS

Anderson et al "Colorimetric Characterization of Digital Cameras Preserving Hue Planes" Thirteenth Color Imaging Conference 2013.*

(Continued)

*Primary Examiner* — Sean T Motsinger
(74) *Attorney, Agent, or Firm* — Merchant & Gould P.C.

(57) ABSTRACT

Color correction methods relate device dependent sensor responses (RGB) to device independent color values (XYZ). The present invention discloses a new approach to Hue Plane Preserving Color Correction (HPPCC) using weighted constrained 3×3 matrices. Accordingly, the methods of the present invention employ hue angle specific weighted matrixing. Given a device RGB from which a device hue angle is derived, a corresponding transformation matrix is found as the normalized weighted sum of all pre-calculated constrained white point and training color preserving matrices. Each weight is calculated as a power function of the minimum difference between the device and the training color hue angle. The weighting function provides local influence to the matrices that are in close hue angle prox- (Continued)

imity to the device color. The power of the function can be further optimized for global accuracy. The methods of the present invention are termed HPPCC-WCM for Hue Plane Preserving Color Correction Weighted Constrained Methods. Experiments performed using different input spectra demonstrate that the claimed methods consistently improve the stability and accuracy of state-of-the-art methods for color correction.

42 Claims, 6 Drawing Sheets

(56) References Cited

U.S. PATENT DOCUMENTS

| | | | |
|---|---|---|---|
| 2011/0292477 A1 | 12/2011 | Klassen et al. | |
| 2013/0050245 A1* | 2/2013 | Longhurst | H04N 9/67 345/590 |
| 2015/0116738 A1* | 4/2015 | Miyanaga | G06K 15/1878 358/1.9 |
| 2016/0180552 A1* | 6/2016 | Li | G06T 11/001 345/591 |
| 2017/0359487 A1* | 12/2017 | Andersen | H04N 1/6005 |

FOREIGN PATENT DOCUMENTS

| | | |
|---|---|---|
| EP | 2869548 A1 | 5/2015 |
| WO | 9810585 A1 | 3/1998 |
| WO | 9810835 A1 | 3/1999 |
| WO | 2013131311 A1 | 9/2013 |

OTHER PUBLICATIONS

J. Hunt; Viewing parameters affecting self-luminous reflection and transmissive colours, Displays, vol. 15, No. 4, pp. 157-162 (1996).
T. Johnson, "Methods for characterizing colour scanners and digital cameras", Displays, vol. 16, No. 4, doi:10.1016/0141-9382(96)01012-8: 183-191, XP004032520 (1996).
D.H. Foster et al., "Frequency of metamerism in natural scenes", Journal of The Optical Society of America A, vol. 23, No. 10: 2359-2372 (2006).
H. E. Ives, "The transformation of color-mixture equations from one system to another. II. Graphical aids", J. Franklin Inst., vol. 195: 23-44 (1923).
G. D. Finlayson et al., "Constrained least-squares regression in color spaces", Journal of Electronic Imaging, vol. 6, No. 4, doi:10.1117/12.278080: 484-493, XP000722192 (1997).
Cheung, V et al., "A Comparative Stydy of the Characterization of Colour Cameras by Means of Neural Networks and Polynomial Transforms", Coloration Technology, vol. 120: 19-25 (2004).
R. S. Berns et al., "Colorimetric characterization of a desktop drum scanner using a spectral model", J. Electronic Imaging, vol. 4(4), doi:10.1117/12.218935: 360-372, XP000538250 (1995).
G. Hong et al., "A Study of Digital Camera Colorimetric Characterisation Based on Polynomial Modelling", Color Research and Application, vol. 26, No. 1: 76-84 (2001).
J.P.S. Parkkinen et al., "Characteristic spectra of Munsell colors", Journal of The Optical Society of America—A, vol. 6, No. 2, doi:10.1364/JOSAA.6.000318: 318-322, XP002574122 (1989).
H.R. Kang et al., "Neural network application to the color scanner and printer calibration", J. Electronic Imaging, vol. 1: 125-134 (1992).
T.L.V. Cheung et al., "Colour camera characterisation using artificial neural networks", IST/SID Tenth Color Imaging Conference, vol. 4: 117-120 (2002).
A. Laratta et al., "Computation of Lagrange Multipliers for Linear Least Squares Problems with Equality Constrains". Computing, Springer Verlag: 335-350 (2001).
P.C. Hung, "Colorimetric calibration in electronic imaging devices using a look-up tables model and interpolations", Journal of Electronic Imaging, vol. 2, No. 1, doi:10.1117/12.132391: 53-61, XP000355272 (1993).
J. Vazquez-Corral et al., "Perceptual Color Characterization of Cameras", Sensors, vol. 14, No. 12, doi:10.3390/s141223205: 23205-23229, XP055258576 (2014).
PL. Vora et al., "Trade-offs Between Color Saturation and Noise Sensitivity in Image Sensors", Proceedings of the 1998 IEEE International Conference on Image Processing (ICIP-98, doi:10.1109/ICIP.1998.723456: 196-200, XP010308860 (1998).
G. Finlayson et al., "Colour Correction Using Root-Polynomial Regression", IEEE Trans. Image Processing, vol. 24, No. 5, doi:10.1109/TIP.2015.2405336: 1460-1470, XP011574917 (2015).
C. F. Andersen et al., "Colorimetric characterization of digital cameras preserving hue planes", Proceedings of the 13th Color and Imaging Conference (CIC): 141-146 (2005).
P. Royston et al., "Regression using Fractional Polynomials of Continouos Covariates: Parsimonious Parametric Modelling", Appl. Statist, 43, No. 3: 429-467 (1994).
J. Jiang et al., "What is the Space of Spectral Sensitivity Functions for Digital Color Cameras?". Proceedigns of the 2013 IEEE Workshop on Applications of Computer Vision (WACV, IEEE Computer Society: 168-179 (2013).
International Search Report for PCT/DK2015/000054, dated Apr. 5, 2016.

* cited by examiner (a) 2D hue planes, artificial data (b) 2D hue planes, real data Oblique box: Provide data for input Circle: Perform calculation Thin rectangular box: Intermediate result Thick rectangular box: Final result

THREE DIMENSIONAL, HUE-PLANE PRESERVING AND DIFFERENTIABLE QUASI-LINEAR TRANSFORMATION METHOD FOR COLOR CORRECTION

CROSS-REFERENCE TO RELATED APPLICATION

This application is a U.S. National Stage Application of PCT/DK2015/000054, filed Dec. 25, 2015, which claims priority to Danish Patent Application No. PA 2014 00757, filed Dec. 25, 2014 and Danish Patent Application No. 2015 00548, filed Sep. 19, 2015, the contents of all of which are hereby incorporated by reference. To the extent appropriate, a claim of priority is made to the each of the above disclosed applications.

TECHNICAL FIELD OF THE INVENTION

The technical field of the invention is digital imaging and computational color imaging. Specifically, the present invention is directed to a method for colorimetric characterization of a digital camera.

BACKGROUND OF THE INVENTION

Hue-plane preserving colorimetric characterization methods for digital cameras are known, and e.g. Danish patent application DK 2005 00666 discloses one such colorimetric characterization method.

US 2015116738 and CN 104601858 relates to an image forming apparatus and a color value conversion method.

Further colorimetric characterization methods for digital cameras are described e.g. in WO 2013/131311 and U.S. Pat. No. 5,398,124.

The prior art does not disclose the presently claimed principles of optimization and improved differentiability of color channel value transformations incorporating Hue-plane preserving colorimetric characterization methods.

SUMMARY OF THE INVENTION

Color channel value transformations constitute an essential element in digital photography, where images will ultimately be viewed by a human observer.

Color correction methods relate device dependent sensor responses (RGB) to device independent color values (XYZ).

The color correction methods of the present invention employ the concept of hue angle specific weighted matrixing and disclose a novel approach to Hue Plane Preserving Color Correction (HPPCC) by using weighted constrained 3×3 matrices.

The methods of the present invention are termed HPPCC-WCM for Hue Plane Preserving Color Correction by Weighted Constrained Matrixing methods.

Given a device RGB from which a device hue angle is derived, a corresponding transformation matrix is found in accordance with the methods and principles of the present invention as the normalized weighted sum of all pre-calculated constrained white point and training color preserving matrices. Each weight is calculated as a parameter dependent and hue-angle dependent weighting function of the minimum difference between the device and the training color hue angle, and the employed weighting function provides local influence to the matrices that are in close hue angle proximity to the device color. The power of the function can be further optimized for global accuracy.

Experiments performed using different input spectra demonstrate that the claimed methods consistently improve the stability and accuracy of state-of-the-art methods for color correction.

Employing the above-cited principles and mathematical equations, the methods of the present invention enable color correction of color channel values from camera responses to the corresponding color channel values of an observer. The relation between said responses is either linear or non-unique.

The color correction of color channel values enabled by the present invention form an essential step in noise reduction, contrast enhancement, and gamut mapping in digital cameras.

Accordingly, in one aspect of the present invention there is provided a novel approach to color correction in digital cameras.

More specifically, the novel approach disclosed in the present application is based on incorporation in a method for color correction of the constraint of hue-plane preservation, including approaches based on the principle of hue-angle dependent weighting.

Hue-planes are defined in a color space, such as color space e.g. denoted "device RGB" and "observer XYZ", respectively, as half-planes spanned by a vector representing a chromatic color, and another vector representing the neutral, white color.

Hue-plane preserving color correction methods according to the present invention can thus be defined as the ability of an essentially non-linear and differentiable transformation ensuring that colors situated on a hue-plane in a first color space, such as a "device color space", are mapped linearly to a corresponding color space on a hue-plane in a second color space, such as an "observer color space".

Accordingly, additive combinations of colors on hue-planes in a first color space—such as e.g. a "device color space"—which are identical to the additive combinations of the spectral reflectance functions of these colors, are mapped to identical, additive combinations of said colors on a corresponding hue-plane of estimated colors in a second color space—such as e.g. an "observer color space".

This essential characteristic associated with the methods of the present invention is believed to be both novel and non-obvious over many prior published approaches. One exception is the classical, comparatively low-accuracy white point preserving 3×3 matrix transformation.

However, while the classical 3×3 matrix method is employing a single "global" matrix for color correction, the present invention is employing a plurality of "local" matrices—in particular one local matrix for each color to be transformed from one color space to another color space by employing the three dimensional, hue-plane preserving and differentiable quasi-linear transformation according to the present invention disclosed herein below in more detail.

The three dimensional, hue-plane preserving and differentiable quasi-linear transformation method according to the present invention is employed with the objective of improving the colorimetric accuracy of existing state-of-the-art color correction methods.

Hue-plane preservation according to the present invention is also employed with the objective of stabilising and improving the estimation of saturated colors.

The three dimensional, hue-plane preserving and differentiable quasi-linear transformation method according to the present invention can also be used e.g. for optimising the characterisation of colors on objects in a 3D-space which additively combines a diffuse and a specular reflection, respectively, situated on a hue-plane.

Essentially, the three dimensional, hue-plane preserving and differentiable quasi-linear transformation method of the present invention combines and retains in a novel and non-obvious way the advantages associated with the general principles of a) the additivity of employing 3×3 matrixing with
b) the flexibility and statistical accuracy of higher order methods, such as, but not limited to, polynomials of varying order by performing a three dimensional, hue-plane preserving and differentiable quasi-linear transformation of device colors in a first color space with a plurality of 3×3 matrices—wherein each 3×3 matrix is dependent on the device color to be transformed.

Each color dependent matrix according to the present invention is based on a hue-angle specific weighting of a set of N pre-calculated training matrices.

A hue-angle as used herein is defined by the angle of any half-line connecting a white training color and a chromatic training color in a chromaticity space.

A training matrix as used herein is white point preserving, and further constrained to preserving one of a set of different training colors. A training matrix is thereby defined to be specific for the hue-angle of the training color for which the training matrix is specific.

While the training color and the white color fix 6 of the 9 parameters in each training matrix being specific for said training color, the remaining 3 parameters are fitted by performing a least-squares optimization aimed at minimizing what can be perceived as being "training errors" for the remaining patches of a characterisation target.

When a device hue-angle is derived for a RGB color space, a corresponding 3×3 transformation matrix can be found as the normalized, weighted sum of each of the N training matrices.

Each weight is calculated e.g. as a differentiable function, for example, but not limited to, a power function of power p of the minimum difference between the device color space hue-angles and estimated, the training color hue-angles.

The weighting function according to the present invention provides local influence for generating the matrices that are in close hue-angle proximity to the device color, and the weighting function ensures and optimizes the differentiability for the transformation function of the present invention.

Accordingly, in one aspect the present method can be described as a hue plane preserving color correction method employing a set of weighted, constrained matrices, and the methods of the present invention disclosed herein below in more detail are thus defined by their overall hue-plane preserving functionality.

As demonstrated by the Phong shading model, this means that all colors on a diffusely reflecting 3D object imaged under a given illuminant will be mapped exactly, or with only a relatively low degree of error, if the diffuse object colors are mapped exactly, or with a corresponding, low degree of error.

In a further aspect of the present invention there is provided a method for performing a three dimensional, hue-plane preserving and differentiable quasi-linear transformation on a given color with first color space R, G, B color channel values by using N 3 by 3 training color matrices defined by a set of N+1 different training colors of which the white color is neutral and the remaining N training colors are chromatic training colors; said method comprising the steps of i) providing first color space R, G, B color channel values for said given color;
ii) calculating first color space hue-angles for said first color space R, G, B color channel values for said given color provided in step i),
iii) generating a first color space hue-angle specific 3 by 3 matrix capable of transforming said first color space R, G, B color channel values for said given color to second color space estimated X, Y, Z color channel values for said given color; and
iv) transforming said first color space R, G, B color channel values for said given color to second color space estimated X, Y, Z color channel values for said given color by multiplying a first color space hue-angle specific 3 by 3 matrix for said given color with said first color space R,G,B color channel values for said given color;

wherein said first color space hue-angle specific 3 by 3 matrix is a weighted, first color space hue-angle specific sum of the N training color matrices;

wherein said first color space hue-angle specific 3 by 3 matrix is specific for the hue angle of said first color space R, G, B color channel values for said given color provided in step i);

v) calculating, for each training color, the weight on each of said N training color matrices, as a parameter set dependent differential function of the minimum hue-angle difference between the first color space hue-angle of said given color and the first color space hue-angle of the training color for which the training color matrix is specific;

vi) obtaining a weighted, first color space hue-angle specific sum by dividing the weight of individual training color matrices with the sum of the weights of all training color matrices; and vii) optimizing the set of parameters of the said parameter dependent differential function for global accuracy of the transformation of first color space R, G, B color channel values to estimated second color space X, Y, Z color channel values by minimizing the sum of the distances between estimated and known second color space X, Y, Z color channel values from a predetermined training set of known training color channel values.

In a still further aspect of the present invention, there is provided a three dimensional, hue-plane preserving and differentiable quasi-linear transformation method of color correction of i) three independent, linear color channel values R, G, B in a first color space to ii) three, estimated, independent color channel values X, Y, Z in a second color space, said method comprising the steps of a) providing N 3 by 3 training color matrices by
    i) providing a predetermined training color set defined by a set of N+1 different training colors of which the white color is neutral and the remaining N training colors are chromatic training colors;

wherein said training color set comprises N+1 known R,G,B color channel values in the first color space, and N+1 corresponding, known X, Y, Z color channel values in the second color space;

wherein each of the N different chromatic training colors and the neutral white color contributes to the definition of a 3 by 3 training color matrix;

wherein each training color matrix is specific for a chromatic training color;

wherein each training color matrix is specific for the white color;

wherein each of the N 3 by 3 training color matrices is obtained by performing a linear least squares regression constrained to both white point preservation and training color preservation;

wherein the chromatic training color and the white color for which a training color matrix is specific is preserved in said constrained linear least squares regression;

wherein the distance between the estimated color channel values X,Y,Z in the second color space, and the known color channel values X,Y,Z in the second color space, is minimized for each of the N training color matrices by performing, for each of the remaining, chromatic training colors, for which a training color matrix is not specific, said constrained linear least squares regression;

wherein each training color is specific for a first color space training color hue-angle measured in the first color space, and specific for a second color space training color hue-angle measured in the second color space;

b) using said N 3 by 3 training color matrices for performing a three dimensional, hue-plane preserving and differentiable quasi-linear transformation on a given color with first color space R,G,B color channel values by
 i) providing first color space R,G,B color channel values for said given color;
 ii) calculating first color space hue-angles for said first color space R,G,B color channel values for said given color provided in step i),
 iii) generating a first color space hue-angle specific 3 by 3 matrix capable of transforming said first color space R,G,B color channel values for said given color to second color space estimated X,Y,Z color channel values for said given color; and
 iv) transforming said first color space R,G,B color channel values for said given color to second color space estimated X,Y,Z color channel values for said given color by multiplying a first color space hue-angle specific 3 by 3 matrix for said given color with said first color space R,G,B color channel values for said given color;

wherein said first color space hue-angle specific 3 by 3 matrix is a weighted, first color space hue-angle specific sum of the N training color matrices;

wherein said first color space hue-angle specific 3 by 3 matrix is specific for the hue angle of said first color space R,G,B color channel values for said given color provided in step i);

wherein the weight on each of said N training color matrices is calculated, for each training color, as a parameter set dependent differential function of the minimum hue-angle difference between the first color space hue-angle of said given color and the first color space hue-angle of the training color for which the training color matrix is specific;

wherein the weighted, first color space hue-angle specific sum is obtained by dividing the weight of individual training color matrices with the sum of the weights of all training color matrices;

wherein the set of parameters for said parameter dependent differential function are optimized for global accuracy of the transformation of first color space R,G,B color channel values to estimated second color space X,Y,Z color channel values by minimizing the sum of the distances between estimated and known second color space X,Y,Z color channel values from a predetermined training set of known training color channel values; and c) testing a predetermined color set of M different testing colors by
 i) providing a predetermined testing color set defined by a set of M different testing color channel values;
 ii) providing M known R,G,B color channel values in a first color space and M corresponding, known X,Y,Z color channel values in a second color space;
 iii) generating estimated X,Y,Z color channel values in the second color space for each of the known R,G,B color channel values in the first color space by applying the three dimensional, hue-plane preserving and differentiable quasi-linear transformation of step b);

wherein a distance, if any, between each of the estimated X,Y,Z color channel values in the second color space, and each of the corresponding known X,Y,Z color channel values in the second color space, is a measure of the accuracy of the three dimensional, hue-plane preserving and differentiable quasi-linear transformation; and wherein a smaller distance between estimated X,Y,Z color channel values in the second color space, and corresponding known X,Y,Z color channel values in the second color space, correlates positively with a higher accuracy of the three dimensional, hue-plane preserving and differentiable quasi-linear transformation.

In yet another aspect of the present invention there is provided a computer program for storage on a data carrier and causing a computer device to perform the methods of the present invention when the computer program is executed on the computer device.

In a still further aspect of the present invention there is provided an image processing device for processing image data from an image sensor, wherein the image processing device comprises a computer program for storage on a data carrier and capable of causing a computer device to perform the methods of the present invention when the computer program is executed on the computer device.

In an even further aspect there is provided a digital camera comprising the image processing device defined herein above.

In yet another aspect of the present invention there is provided a digital camera comprising a computer program for storage on a data carrier and for causing a computer device to perform the methods of the present invention when the computer program is executed on the computer device.

In a still further aspect of the present invention there is provided a computer program stored on a non-transitory computer readable medium, wherein the computer program comprises computer executable program code configured to cause an image processing device, when executing said program code, to perform the methods of the present invention.

In an even further aspect there is provided a non-transitory computer readable medium comprising a computer program comprising computer executable program code configured to cause an image processing device, when executing said program code, to perform the methods of the present invention.

In a still further aspect there is provided a storage medium for storing a program code to be executed by a computer of an image processing device, wherein the program code stored on said storage medium is configured to cause the image processing device to execute said program code and perform the methods of the present invention. The image processing device is preferably a digital camera.

There is also provided in accordance with the present invention a digital camera module configured to provide and process image data defined by first color space R,G,B color channel values; said digital camera comprising
  a) at least one processor; and
  b) at least one memory module comprising a computer executable program code,
  wherein said at least one processor and said at least one memory module comprising said computer executable program code is configured to execute a three dimensional, hue-plane preserving and differentiable quasi-linear transformation on a given color with first color space R,G,B color channel values by using N 3 by 3 training color matrices defined by a set of N+1 different training colors of which the white color is neutral and the remaining N training colors are chromatic training colors.

In a still further aspect there is provided a digital camera module configured to provide and process image data defined by first color space R,G,B color channel values; said digital camera comprising
  a) at least one processor; and
  b) at least one memory module comprising a computer executable program code,
  wherein said at least one processor and said at least one memory module comprising said computer executable program code is configured to execute a three dimensional, hue-plane preserving and differentiable quasi-linear transformation method of color correction of
  i) three independent, linear color channel values R,G,B in a first color space to
  ii) three, estimated, independent color channel values X,Y,Z in a second color space.
  wherein the three dimensional, hue-plane preserving and differentiable quasi-linear transformation is performed on a given color with first color space R,G,B color channel values by using N 3 by 3 training color matrices defined by a set of N+1 different training colors of which the white color is neutral and the remaining N training colors are chromatic training colors.

BRIEF DESCRIPTION OF THE FIGURES

In FIG. 5, the HPPCC-WCM (Hue-plane preserving color correction by weighted constrained matrixing) method is used on a given color with known first color space R,G,B color channel values. Provided data, calculations and results are illustrated in the figure.
  i) Provide N training color matrices.
  ii) Provide N corresponding first color space training color hue-angles for the N training color matrices provided in step i).
  iii) Provide the parameters of the parameter set dependent and hue-angle dependent, differential weighting function (obtained in step xii) in above-cited legend to FIG. 4)—indicated in the present figure as a power function of power p.
  iv) Provide white balanced first color space color channel values for one or more colors.
  v) Calculate for said one or more colors the first color space color hue-angle for said first color space color values.
  vi) Obtain first color space color hue-angle for said one or more colors.
  vii) Calculate the weights for each of the training color matrices pertaining to said one or more colors.

viii) Obtain N training color matrix weights for said one or more colors.
ix) Calculate for said one or more colors a hue-angle specific transformation matrix by adding together the N weighted training color matrices calculated by multiplying each of the training color matrices with its corresponding normalized weight by applying the hue-angle specific 3 by 3 transformation matrix for a given color to said first color space R,G,B color channel values by matrix multiplication.
x) Obtain estimated white balanced second color space X_estim, Y_estim, Z_estim color channel values for said one or more colors.

Figure 6:
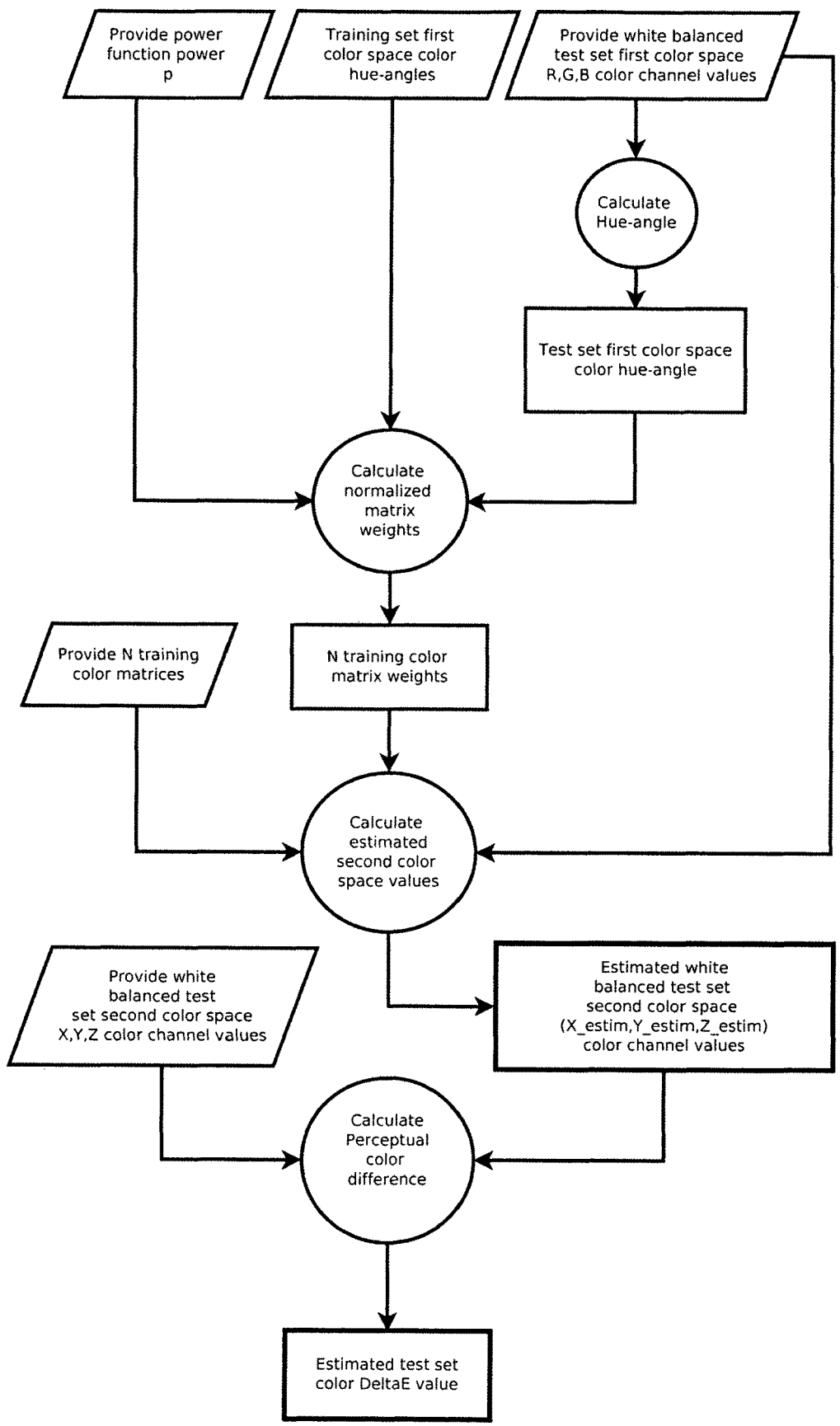

FIG. 6 illustrates testing the HPPCC-WCM (Hue-plane preserving color correction by weighted constrained matrixing) method on a test color with known test set first color space R,G,B color channel values, and corresponding test set second color space X,Y,Z color channel values. Provided data, calculations and results are illustrated in the figure.

i) Provide N training color matrices.
ii) Provide N corresponding first color space training color hue-angles for the N training color matrices provided in step i).
iii) Provide the parameters for the parameter set dependent and hue-angle dependent, differential weighting function—indicated in the figure as a power function of power p.
iv) Provide white balanced test set first color space R,G,B color channel values for one or more colors.
v) Calculate the hue-angles for said test set first color space R,G,B color channel values.
vi) Obtain test set first color space R,G,B color hue-angles for said test set.
vii) Calculate the weights for each of the training color matrices pertaining to said test set colors.
viii) Obtain N training color matrix weights for each of the colors in the test set.
ix) Calculate for each of said colors of the test set a hue-angle specific transformation matrix by adding together the N weighted training color matrices calculated by multiplying each of the training color matrices with its corresponding, normalized weight by applying the hue-angle specific 3 by 3 transformation matrix for a given color of the test set to said first color space R,G,B color channel values by matrix multiplication.
x) Obtain estimated white balanced second color space X_estim, Y_estim, Z_estim color channel values for each of the colors of the test set.
xi) Provide the known test set second color space X,Y,Z color channel values.
xii) Calculate perceptual color differences for each of the colors of the test set pertaining to the second color space X,Y,Z color channel values and the second color space estimated X_estim, Y_estim, Z_estim color channel values by transformation of said known and estimated second color space X,Y,Z and X_estim, Y_estim, Z_estim color channel values, respectively, into a further color space in which geometrical distance is a measure of perceptual difference.
xiii) Obtain estimated test set color differences (e.g. DeltaE in case of CIELab or CIELuv).

The present invention can also be characterized by the below-cited items:

1. A method for performing a three dimensional, hue-plane preserving and differentiable quasi-linear transformation on a given color with first color space R,G,B color channel values by using N 3 by 3 training color matrices defined by a set of N+1 different training colors of which the white color is neutral and the remaining N training colors are chromatic training colors; said method comprising the steps of
   i) providing first color space R,G,B color channel values for said given color;
   ii) calculating first color space hue-angles for said first color space R,G,B color channel values for said given color provided in step i),
   iii) generating a first color space hue-angle specific 3 by 3 matrix capable of transforming said first color space R,G,B color channel values for said given color to second color space estimated X,Y,Z color channel values for said given color; and
   iv) transforming said first color space R,G,B color channel values for said given color to second color space estimated X,Y,Z color channel values for said given color by multiplying a first color space hue-angle specific 3 by 3 matrix for said given color with said first color space R,G,B color channel values for said given color;
   wherein said first color space hue-angle specific 3 by 3 matrix is a weighted, first color space hue-angle specific sum of the N training color matrices;
   wherein said first color space hue-angle specific 3 by 3 matrix is specific for the hue angle of said first color space R,G,B color channel values for said given color provided in step i);
   v) calculating, for each training color, the weight on each of said N training color matrices, as a parameter set dependent differential function of the minimum hue-angle difference between the first color space hue-angle of said given color and the first color space hue-angle of the training color for which the training color matrix is specific;
   vi) obtaining a weighted, first color space hue-angle specific sum by dividing the weight of individual training color matrices with the sum of the weights of all training color matrices; and
   vii) optimizing the set of parameters of the said parameter dependent differential function for global accuracy of the transformation of first color space R,G,B color channel values to estimated second color space X,Y,Z color channel values by minimizing the sum of the distances between estimated and known second color space X,Y,Z color channel values from a predetermined training set of known training color channel values.

2. A three dimensional, hue-plane preserving and differentiable quasi-linear transformation method of color correction of i) three independent, linear color channel values R,G,B in a first color space to ii) three, estimated, independent color channel values X,Y,Z in a second color space, said method comprising the steps of
   a) providing N 3 by 3 training color matrices by
      i) providing a predetermined training color set defined by a set of N+1 different training colors of which the white color is neutral and the remaining N training colors are chromatic training colors;
      wherein said training color set comprises N+1 known R,G,B color channel values in the first color space, and N+1 corresponding, known X,Y,Z color channel values in the second color space;

wherein each of the N different chromatic training colors and the neutral white color contributes to the definition of a 3 by 3 training color matrix;

wherein each training color matrix is specific for a chromatic training color;

wherein each training color matrix is specific for the white color;

wherein each of the N 3 by 3 training color matrices is obtained by performing a linear least squares regression constrained to both white point preservation and training color preservation;

wherein the chromatic training color and the white color for which a training color matrix is specific is preserved in said constrained linear least squares regression;

wherein the distance between the estimated color channel values X,Y,Z in the second color space, and the known color channel values X,Y,Z in the second color space, is minimized for each of the N training color matrices by performing, for each of the remaining, chromatic training colors, for which a training color matrix is not specific, said constrained linear least squares regression;

wherein each training color is specific for a first color space training color hue-angle measured in the first color space, and specific for a second color space training color hue-angle measured in the second color space;

b) using said N 3 by 3 training color matrices for performing a three dimensional, hue-plane preserving and differentiable quasi-linear transformation on a given color with first color space R,G,B color channel values by
  i) providing first color space R,G,B color channel values for said given color;
  ii) calculating first color space hue-angles for said first color space R,G,B color channel values for said given color provided in step i),
  iii) generating a first color space hue-angle specific 3 by 3 matrix capable of transforming said first color space R,G,B color channel values for said given color to second color space estimated X,Y,Z color channel values for said given color; and
  iv) transforming said first color space R,G,B color channel values for said given color to second color space estimated X,Y,Z color channel values for said given color by multiplying a first color space hue-angle specific 3 by 3 matrix for said given color with said first color space R,G,B color channel values for said given color;

wherein said first color space hue-angle specific 3 by 3 matrix is a weighted, first color space hue-angle specific sum of the N training color matrices;

wherein said first color space hue-angle specific 3 by 3 matrix is specific for the hue angle of said first color space R,G,B color channel values for said given color provided in step i);

wherein the weight on each of said N training color matrices is calculated, for each training color, as a parameter set dependent differential function of the minimum hue-angle difference between the first color space hue-angle of said given color and the first color space hue-angle of the training color for which the training color matrix is specific;

wherein the weighted, first color space hue-angle specific sum is obtained by dividing the weight of individual training color matrices with the sum of the weights of all training color matrices;

wherein the set of parameters for said parameter dependent differential function are optimized for global accuracy of the transformation of first color space R,G,B color channel values to estimated second color space X,Y,Z color channel values by minimizing the sum of the distances between estimated and known second color space X,Y,Z color channel values from a predetermined training set of known training color channel values;

c) testing a predetermined color set of M different testing colors by
  i) providing a predetermined testing color set defined by a set of M different testing color channel values;
  ii) providing M known R,G,B color channel values in a first color space and M corresponding, known X,Y,Z color channel values in a second color space;
  iii) generating estimated X,Y,Z color channel values in the second color space for each of the known R,G,B color channel values in the first color space by applying the three dimensional, hue-plane preserving and differentiable quasi-linear transformation of step b);

wherein a distance, if any, between each of the estimated X,Y,Z color channel values in the second color space, and each of the corresponding known X,Y,Z color channel values in the second color space, is a measure of the accuracy of the three dimensional, hue-plane preserving and differentiable quasi-linear transformation;

wherein a smaller distance between estimated X,Y,Z color channel values in the second color space, and corresponding known X,Y,Z color channel values in the second color space, correlates positively with a higher accuracy of the three dimensional, hue-plane preserving and differentiable quasi-linear transformation.

3. The method of any of items 1 and 2, wherein the estimated X,Y,Z color channel values in the second color space are converted to estimated color channel values in a further color space, and wherein the corresponding known X,Y,Z color channel values in the second color space are converted to known color channel values in said further color space, and wherein the distances are distances between converted estimated color channel values in the further color space, and converted known color channel values in said further color space.

4. The method of any of items 2 and 3, wherein said distances are converted to color differences for further evaluation of the accuracy of the transformation.

5. The method of any of items 2 and 3, wherein smaller perceptual color distances, evaluated as average, median and maximum values, are evidence of a more accurate transformation.

6. The method of any of items 1 and 2, wherein said distances are measured as the sum of N euclidian distances between estimated second color space X,Y,Z color channel values, and known second color space X,Y,Z color channel values.

7. The method of any of items 1 and 2, wherein said parameter set dependent differential function is a power function of power p.

8. The method of any of items 1 and 2, wherein said parameter set dependent differential function is a polynomial of order n with n+1 co-efficients.
9. The method of any of items 1 and 2, wherein said parameter set dependent differential function is a look-up-table.
10. The method of any of items 1 and 2, wherein said parameter set dependent differential function is trigonometric function.
11. The method of any of items 1 and 2, wherein said parameter set dependent differential function is an exponential function.
12. The method of any of items 8, 9, 10 and 11, wherein said parameter set is independent of the hue-angle of the hue angle of said first color space R,G,B color channel values for said given color provided in item 2, b), step i) for which the said first color space hue-angle specific 3 by 3 matrix is specific.
13. The method of any of items 8, 9, 10 and 11, wherein said parameter set is dependent of the hue-angle of the hue angle of said first color space R,G,B color channel values for said given color provided in item 2, b), step i) for which the said first color space hue-angle specific 3 by 3 matrix is specific.
14. The method of any of items 1 and 2, wherein the optimization of the parameters of said parameters dependent differential function is performed by using a leave-one-out paradigm on said training color set used for the generation of the training color matrices.
15. The method of any of items 1 and 2, wherein the optimization of the parameters of said parameters dependent differential function is performed by using a subset of a training color set used for the generation of of the training color matrices and using the remaining colors of said training color set for for optimization.
16. The method of any of items 1 and 2, wherein the optimization of p is performed by using a leave-one-out paradigm on said training color set used for the generation of the training color matrices.
17. The method of any of items 1 and 2, wherein an image norm is used for measuring the distances between estimated second color space X,Y,Z color channel values, and known second color space X,Y,Z color channel values.
18. The method of item 17, wherein image norm 2, is used for measuring the distances between estimated second color space X,Y,Z color channel values, and known second color space X,Y,Z color channel values.
19. The method of any of items 17 and 18, wherein distances between estimated second color space X,Y,Z color channel values, and known second color space X,Y,Z color channel values are measured in CIELab values.
20. The method of any of items 17 and 18, wherein distances between estimated second color space X,Y,Z color channel values, and known second color space X,Y,Z color channel values are measured in CIELuv values.
21. The method of any of items 17 and 18, wherein distances between estimated second color space X,Y,Z color channel values, and known second color space X,Y,Z color channel values are measured in ATD color space values.
22. The method of any of items 17 and 18, wherein distances between estimated second color space X,Y,Z color channel values, and known second color space X,Y,Z color channel values are measured in Natural Color Space values.
23. The method of any of items 17 and 18, wherein distances between estimated second color space X,Y,Z color channel values, and known second color space X,Y,Z color channel values are measured in a color space wich is linearly related to second color space X,Y,Z color channel values.
24. The method of any of items 1 and 2, wherein said distances between estimated and known second color space X, Y, Z color channel values from the predetermined training set of known training color channel values are perceptual color differences, or colorimetric color differences.
25. The method of any of items 1 and 2, wherein the predetermined color set of N+1 colors are provided by synthetic color formation.
26. The method of any of items 1 and 2, wherein the predetermined color set of N+1 colors are physically recorded by a device yielding linearized color channel values.
27. The method of any of items 1 and 2, wherein first color channel values and second color channel values are essentially linearly related to reflectance.
28. The method of any of items 1 and 2, wherein first color channel values and second color channel values are essentially linearly related to irradiance.
29. The method of any of items 1 and 2, wherein first color channel values and second color channel values are essentially linearly related to exposure time.
30. The method of any of items 1 and 2, wherein first color channel values are white balanced to unit values in the white color for each color channel by dividing all color channel values with the color value of the white of the first color space.
31. The method of any of items 1 and 2, wherein second color channel values are white balanced to unit values in the white color for each color channel by dividing all color channel values with the color value of the white of the second color space.
32. The method of any of items 1 and 2, wherein a first color space white point is defined by unit values of R,G,B in the first color space and a color space white point is defined by unit values of X,Y,Z in second color space.
33. The method of any of items 1 and 2, wherein a known, synthetic color formation of a color channel value for a colored surface is calculated by integration of known spectral sensitivities per device channel multiplied by the relative spectral power distribution of the surface.
34. The method of item 33, wherein said relative spectral power distribution is equal to the spectral reflection function of the surface multiplied with the relative spectral power distribution of the illuminant, essentially as set forth in Equations 1 and 2 herein.
35. The method of any of items 1 and 2, wherein a known physical recording of color channel values is provided when a device is exposed to the spectral power distribution of a surface.
36. The method of any of items 1 and 2, wherein said white point color channel values are the device color channel values found among the training colors as a strongly neutrally reflecting surface with a spectral reflectance function close to perfect reflecting diffuser.
37. The method of any of items 1 and 2, wherein said white point color channel values are the result of a 37. (continued) linear least squares estimation, based on color channel values pertaining to the said training color set, of what the device color channel values would have been on the perfect reflecting diffuser.

38. The method of any of items 1 and 2, wherein a color space is a 3 dimensional euclidian space spanned by three vectors of either R,G,B color channel values or X,Y,Z color channel values.

39. The method of any of items 1 and 2, wherein the hue-angle of a chromatic color is defined in chromaticity space as the angle between an arbitrary and fixed half-line emanating from the chromaticity point of the neutral, white color to the half-line emanating from neutral, white color to the chromaticity point of said chromatic color, essentially as set forth in Equations 21, 22, 23, 24, and 25 herein.

40. The method of any of items 1 and 2, wherein the first device chromaticity space is a 2 dimensional space formed by the central projection of the R,G,B first color space values onto a plane with chromaticity values on the first axis r calculated by r=R/(R+G+B), and on the second axis g calculated by g=G/(R+G+B) forming a chromaticity point (r,g) for that color.

41. The method of item 40, wherein the first color space white point gets chromaticity values r=⅓, g=⅓.

42. The method of any of items 1 and 2, wherein the second device chromaticity space is a 2 dimensional space formed by the central projection of the second color space values X,Y,Z onto a plane with chromaticity values on the first axis x calculated by x=X/(X+Y+Z), and on the second axis y calculated by y=Y/(X+Y+Z) forming a chromaticity point (x,y) for that color.

43. The method of item 42, wherein the second device white point gets chromaticity values x=⅓, y=⅓.

44. The method of any of items 1 and 2, wherein the hue-plane preservation comprises the retainment in the said transformation function of all additive combinations of colors on hue-planes, essentially as set forth in Equations 19, and 20 herein.

45. The method of item 44, wherein hue-planes of the first color space defined as half-planes spanned by a vector representing a chromatic color, and a vector representing the neutral white color, are transformed to corresponding hue-planes in the second color space defined as half-planes spanned by a vector representing the estimated second device color channel values of the said chromatic color, and a vector representing the second device color channel values of the said neutral white color.

46. The method of item 44, wherein additive combinations of colors on hue-planes are identical to the additive combinations of the spectral reflectance functions of the respective colors.

47. The method of item 46, wherein a spectral reflectance function is expressed as a linear combination of a spectral reflection function of the white color and a spectral reflectance function of a chromatic color, essentially as set forth in Equations 15, 16, 17, 18, 19 and 20 herein.

48. The method of item 44, wherein said retainment is a hue-plane preservation.

49. The method of item 48, wherein said hue-plane preservation is obtained by using a transformation method employing a transformation in the form of a white point preserving 3 by 3 matrix.

50. The method of item 49, wherein said transformation method is a hue-plane preserving color correction method.

51. The method of any of items 1 and 2, wherein the differentiable weighting function applied to the training matrices ensures the differentiability in the full color space of the transformation function.

52. The method of any of items 1 and 2, wherein the transformation function is transforming device colors on individual hue-planes linearly, but may be transforming device colors non-linearly crossing hue-planes.

53. A hue-plane preserving color correction by weighted constrained matrixing method performed on a test color with known test set first color space R,G,B color channel values, and corresponding test set second color space X,Y,Z color channel values, said method comprising the steps of
   i) providing N training color matrices;
   ii) providing N corresponding first color space training color hue-angles for the N training color matrices provided in step i);
   iii) providing parameters for a parameter dependent and hue angle dependent differentiable weighting function;
   iv) providing white balanced first color space color values for one or more colors;
   v) calculating, for said one or more colors, a first color space color hue-angle for said first color space color values;
   vi) obtaining a first color space color hue-angle for said one or more colors;
   vii) calculating the weights for each of the training color matrices pertaining to said one or more colors;
   viii) obtaining N training color matrix weights for each of said one or more colors;
   ix) calculating, for each of said one or more colors, a hue-angle specific transformation matrix by adding together the N weighted training color matrices calculated by multiplying each of the training color matrices with its corresponding normalized weight by applying a hue-angle specific 3 by 3 transformation matrix for a given color to said first color space R,G,B color channel values by matrix multiplication; thereby
   x) obtaining estimated white balanced second color space X_estim, Y_estim, Z_estim color channel values for each of said one or more colors; said method comprising the further steps of
   xi) providing known test set second color space X,Y,Z color channel values;
   xii) calculating perceptual color differences for each of the colors of the test set pertaining to the second color space X,Y,Z color channel values, and the second color space estimated X_estim, Y_estim, Z_estim color channel values, by transformation of said known and estimated second color space X,Y,Z and X_estim, Y_estim, Z_estim color channel values, respectively, into a further color space in which geometrical distance is a measure of perceptual difference; thereby
   xiii) obtaining a set of estimated test set color differences.

54. The method of item 53, wherein the estimated X,Y,Z color channel values in the second color space are converted to estimated color channel values in a further color space, and wherein the corresponding known X,Y,Z color channel values in the second color space are converted to known color channel values in said further color space, and wherein the distances are distances between converted estimated color channel values in the further color space, and converted known color channel values in said further color space.
55. The method of any of items 53 and 54, wherein said distances are converted to color differences for further evaluation of the accuracy of the transformation.
56. The method of any of items 53 and 54, wherein smaller perceptual color distances, evaluated as average, median and maximum values, are evidence of a more accurate transformation.
57. The method of item 53, wherein said distances are measured as the sum of N euclidian distances between estimated second color space X,Y,Z color channel values, and known second color space X,Y,Z color channel values.
58. The method of item 53, wherein said parameter set dependent differential function is a power function of power p.
59. The method of item 53, wherein said parameter set dependent differential function is a polynomial of order n with n+1 co-efficients.
60. The method of item 53, wherein said parameter set dependent differential function is a look-up-table.
61. The method of item 53, wherein said parameter set dependent differential function is trigonometric function.
62. The method of item 53, wherein said parameter set dependent differential function is an exponential function.
63. The method of any of items 59 to 62, wherein said parameter set is independent of the hue-angle of the hue angle of said first color space R,G,B color channel values for said given color provided in item 53 for which the said first color space hue-angle specific 3 by 3 matrix is specific.
64. The method of any of any of items 59 to 62, wherein said parameter set is dependent of the hue-angle of the hue angle of said first color space R,G,B color channel values for said given color provided in item 53 for which the said first color space hue-angle specific 3 by 3 matrix is specific.
65. The method of item 53, wherein the optimization of the parameters of said parameters dependent differential function is performed by using a leave-one-out paradigm on said training color set used for the generation of the training color matrices.
66. The method of item 53, wherein the optimization of the parameters of said parameters dependent differential function is performed by using a subset of a training color set used for the generation of the training color matrices and using the remaining colors of said training color set for optimization.
67. The method of item 53, wherein the optimization of p is performed by using a leave-one-out paradigm on said training color set used for the generation of the training color matrices.
68. The method of item 53, wherein an image norm is used for measuring the distances between estimated second color space X,Y,Z color channel values, and known second color space X,Y,Z color channel values.
69. The method of item 68, wherein image norm 2, is used for measuring the distances between estimated second color space X,Y,Z color channel values, and known second color space X,Y,Z color channel values.
70. The method of any of items 68 and 69, wherein distances between estimated second color space X,Y,Z color channel values, and known second color space X,Y,Z color channel values are measured in CIELab values.
71. The method of any of items 68 and 69, wherein distances between estimated second color space X,Y,Z color channel values, and known second color space X,Y,Z color channel values, are measured in CIELuv values.
72. The method of any of items 68 and 69, wherein distances between estimated second color space X,Y,Z color channel values, and known second color space X,Y,Z color channel values, are measured in ATD color space values.
73. The method of any of items 68 and 69, wherein distances between estimated second color space X,Y,Z color channel values, and known second color space X,Y,Z color channel values are measured in Natural Color Space values.
74. The method of any of items 68 and 69, wherein distances between estimated second color space X,Y,Z color channel values, and known second color space X,Y,Z color channel values are measured in a color space which is linearly related to second color space X,Y,Z color channel values.
75. The method of item 53, wherein said distances between estimated and known second color space X,Y,Z color channel values from the predetermined training set of known training color channel values are perceptual color differences, or colorimetric color differences.
76. The method of item 53, wherein the predetermined color set of N+1 colors are provided by synthetic color formation.
77. The method of item 53, wherein the predetermined color set of N+1 colors are physically recorded by a device yielding linearized color channel value.
78. The method of item 53, wherein first color channel values and second color channel values are essentially linearly related to reflectance.
79. The method of item 53, wherein first color channel values and second color channel values are essentially linearly related to irradiance.
80. The method of item 53, wherein first color channel values and second color channel values are essentially linearly related to exposure time.
81. The method of item 53, wherein first color channel values are white balanced to unit values in the white color for each color channel by dividing all color channel values with the color value of the white of the first color space.
82. The method of item 53, wherein second color channel values are white balanced to unit values in the white color for each color channel by dividing all color channel values with the color value of the white of the second color space.
83. The method of item 53, wherein a first color space white point is defined by unit values of R,G,B in the first color space and a color space white point is defined by unit values of X,Y,Z in second color space.
84. The method of item 53, wherein a known, synthetic color formation of a color channel value for a colored surface is calculated by integration of known spectral sensitivities per device channel multiplied by the relative spectral power distribution of the surface.

85. The method of item 84, wherein said relative spectral power distribution is equal to the spectral reflection function of the surface multiplied with the relative spectral power distribution of the illuminant, essentially as set forth in Equations 1 and 2 herein.
86. The method of item 53, wherein a known physical recording of color channel values is provided when a device is exposed to the spectral power distribution of a surface.
87. The method of item 53, wherein said white point color channel values are the device color channel values found among the training colors as a strongly neutrally reflecting surface with a spectral reflectance function close to perfect reflecting diffuser.
88. The method of item 53, wherein said white point color channel values are the result of a linear least squares estimation, based on color channel values pertaining to the said training color set, of what the device color channel values would have been on the perfect reflecting diffuser.
89. The method of item 53, wherein a color space is a 3 dimensional euclidian space spanned by three vectors of either R,G,B color channel values or X,Y,Z color channel values.
90. The method of item 53, wherein the hue-angle of a chromatic color is defined in chromaticity space as the angle between an arbitrary and fixed half-line emanating from the chromaticity point of the neutral, white color to the half-line emanating from neutral, white color to the chromaticity point of said chromatic color, essentially as set forth in Equations 21, 22, 23, 24, and 25 herein.
91. The method of item 53, wherein the first device chromaticity space is a 2 dimensional space formed by the central projection of the R,G,B first color space values onto a plane with chromaticity values on the first axis r calculated by r=R/(R+G+B), and on the second axis g calculated by g=G/(R+G+B) forming a chromaticity point (r,g) for that color.
92. The method of item 91, wherein the first color space white point gets chromaticity values r=⅓, g=⅓.
93. The method of item 53, wherein the second device chromaticity space is a 2 dimensional space formed by the central projection of the second color space values X,Y,Z onto a plane with chromaticity values on the first axis x calculated by x=X/(X+Y+Z), and on the second axis y calculated by y=Y/(X+Y+Z) forming a chromaticity point (x,y) for that color.
94. The method of item 93, wherein the second device white point gets chromaticity values x=⅓, y=⅓.
95. The method of item 53, wherein the hue-plane preservation comprises the retainment in the said transformation function of all additive combinations of colors on hue-planes, essentially as set forth in Equations 19, and 20 herein.
96. The method of item 95, wherein hue-planes of the first color space defined as half-planes spanned by a vector representing a chromatic color, and a vector representing the neutral white color, are transformed to corresponding hue-planes in the second color space defined as half-planes spanned by a vector representing the estimated second device color channel values of the said chromatic color, and a vector representing the second device color channel values of the said neutral white color.
97. The method of item 95, wherein additive combinations of colors on hue-planes are identical to the additive combinations of the spectral reflectance functions of the respective colors.
98. The method of item 97, wherein a spectral reflectance function is expressed as a linear combination of a spectral reflection function of the white color and a spectral reflectance function of a chromatic color, essentially as set forth in Equations 15, 16, 17, 18, 19, and 20 herein.
99. The method of item 95, wherein said retainment is a hue-plane preservation.
100. The method of item 99, wherein said hue-plane preservation is obtained by using a transformation method employing a transformation in the form of a white point preserving 3 by 3 matrix.
101. The method of item 100, wherein said transformation method is a hue-plane preserving color correction method.
102. The method of item 53, wherein the differentiable weighting function applied to the training matrices ensures the differentiability in the full color space of the transformation function.
103. The method of item 53, wherein the transformation function is transforming device colors on individual hue-planes linearly, but may be transforming device colors non-linearly crossing hue-planes.
104. A computer program stored on a non-transitory computer readable medium, wherein the computer program comprises computer executable program code configured to cause an image processing device, when executing said program code, to perform the method of any of items 1 to 52 or the method of any of items 53 to 103.
105. A non-transitory computer readable medium comprising the computer program according to item 104.
106. A storage medium for storing a program code to be executed by a computer of an image processing device, wherein the program code stored on said storage medium is configured to cause the image processing device to execute said program code and perform the method of any of items 1 to 52 or the method of any of items 53 to 103.
107. The storage medium according to item 106, wherein the image processing device is a digital camera.
108. A digital camera module configured to provide and process image data defined by first color space R,G,B color channel values; said digital camera comprising
a) at least one processor; and
b) at least one memory module comprising a computer executable program code,
wherein said at least one processor and said at least one memory module comprising said computer executable program code is configured to execute a three dimensional, hue-plane preserving and differentiable quasi-linear transformation on a given color with first color space R,G,B color channel values by using N 3 by 3 training color matrices defined by a set of N+1 different training colors of which the white color is neutral and the remaining N training colors are chromatic training colors.
109. A digital camera module configured to provide and process image data defined by first color space R,G,B color channel values; said digital camera comprising
a) at least one processor; and
b) at least one memory module comprising a computer executable program code,
wherein said at least one processor and said at least one memory module comprising said computer executable program code is configured to execute a three dimensional, hue-plane preserving and differentiable quasi-linear transformation method of color correction of
i) three independent, linear color channel values R,G,B in a first color space to
ii) three, estimated, independent color channel values X,Y,Z in a second color space.
wherein the three dimensional, hue-plane preserving and differentiable quasi-linear transformation is performed on a given color with first color space R,G,B color channel values by using N 3 by 3 training color matrices defined by a set of N+1 different training colors of which the white color is neutral and the remaining N training colors are chromatic training colors.

110. The digital camera module according to any of items 108 and 109, wherein said computer executable program code is configured to execute a hue-plane preserving color correction weighted constrained matrixing color correction method on a given color with known first color space R,G,B color channel values, said method comprising the steps of
i) providing N training color matrices;
ii) providing N corresponding first color space training color hue-angles for the N training color matrices provided in step i);
iii) providing parameters for a parameter dependent and hue angle dependent differentiable weighting function;
iv) providing white balanced first color space color values for one or more colors;
v) calculating, for said one or more colors, a first color space color hue-angle for said first color space color values;
vi) obtaining a first color space color hue-angle for said one or more colors;
vii) calculating the weights for each of the training color matrices pertaining to said one or more colors;
viii) obtaining N training color matrix weights for said one or more colors;
ix) calculating, for said one or more colors, a hue-angle specific transformation matrix by adding together the N weighted training color matrices calculated by multiplying each of the training color matrices with its corresponding normalized weight by applying a hue-angle specific 3 by 3 transformation matrix for a given color to said first color space R,G,B color channel values by matrix multiplication; thereby
x) obtaining estimated white balanced second color space X_estim, Y_estim, Z_estim color channel values for said one or more colors.

111. The digital camera module according to any of items 108 to 110, wherein said computer executable program code is further configured to execute a hue-plane preserving color correction weighted constrained matrixing color correction method on a test color with known test set first color space R,G,B color channel values, and corresponding test set second color space X,Y,Z color channel values, said method comprising the steps of
i) providing N training color matrices;
ii) providing N corresponding first color space training color hue-angles for the N training color matrices provided in step i);
iii) providing parameters for a parameter dependent and hue-angle dependent differentiable weighting function;
iv) providing white balanced test set first color space color values for one or more colors;
v) calculating the hue-angles for said test set first color space color values;
vi) obtaining test set first color space color hue-angles for said test set;
vii) calculating the weights for each of the training color matrices pertaining to said test set colors;
viii) obtaining N training color matrix weights for each of the colors in the test set;
ix) calculating for each of said colors of the test set a hue-angle specific transformation matrix by adding together the N weighted training color matrices calculated by multiplying each of the training color matrices with its corresponding, normalized weight by applying a hue-angle specific 3 by 3 transformation matrix for a given color of the test set to said first color space R,G,B color channel values by matrix multiplication;
x) obtaining estimated white balanced second color space X_estim, Y_estim, Z_estim color channel values for each of the colors of the test set; wherein said method comprises the further steps of:
xi) providing known test set second color space X,Y,Z color channel values;
xii) calculating perceptual color differences for each of the colors of the test set pertaining to the second color space X,Y,Z color channel values, and the second color space estimated X_estim, Y_estim, Z_estim color channel values, by transformation of said known and estimated second color space X,Y,Z and X_estim, Y_estim, Z_estim color channel values, respectively, into a further color space in which geometrical distance is a measure of perceptual difference; thereby
xiii) obtaining a set of estimated test set color differences.

112. The digital camera module according to any of items 108 to 111, wherein said computer executable program code is configured to execute a hue-plane preserving color correction weighted constrained matrixing method on a test color with known test set first color space R,G,B color channel values, and corresponding test set second color space X,Y,Z color channel values essentially as defined in any of items 1 to 103.

The present invention is supported and exemplified by a comprehensive evaluation of multiple training color sets and test color sets.

Results disclosed herein below derived from a large set of reflectances, illuminants and cameras, both with or without noise, show that the above-cited, three dimensional, hue-plane preserving and differentiable quasi-linear transformation methods of the present invention—by combining
a) additivity in color matching, with
b) flexibility and statistical accuracy of higher order methods significantly outperform state-of the-art color correction methods on the stability of saturated colors, and on colors on hueplanes derived from any diffuse test set of colors.

In summary, data obtained from 31 cameras and illuminants evidences—as disclosed herein below—that the three dimensional, hue-plane preserving and differentiable quasi-linear transformation methods of the present invention are not only able to combine a) additivity in color matching, with
b) flexibility and statistical accuracy of higher order methods,
but also generate results which are superior in many aspects over state-of-the-art methods for color correction.

The present invention is further disclosed and exemplified herein below.

I. Detailed Description of the Invention

Camera characterisation is an essential element in image processing, since it relates the camera RGB values to colorimetric XYZ values [1], [2] by color correction. This is crucial in any element of digital photography where the images will ultimately be viewed by a human observer, and is a key step in disciplines such as noise reduction, contrast enhancement and gamut mapping, for the same reason. Typically, commercial RGB cameras will have a characterization transform hard-coded into the on-board processing, but bespoke transforms can also be built for lab-based imaging setups [3].

The relation between device RGB and CIE XYZ is not straightforward. There are several reasons for this, the principal one being filter metamerism. Filter metamerism is a consequence of the fact that typical RGB cameras do not use colorimetric sensor filters; i.e. a linear transformation between the CIE color matching functions and the sensor spectral sensitivities does not exist. As a result, the Luther Conditions are not met [4], [5], and multiple color spectra may therefore give rise to identical camera responses, yet have different CIE XYZ values, or vice versa [6]. Although colorimetric filters are technically plausible, they are generally not used due to manufacturing limitations and noise considerations. Therefore optimized rather than exact solutions are usually sought [1], [7], [8].

Typically optimized transforms are based on linear least squares regression [1], [9], although extensions using non-linear methods have also been proposed. These have the goal of reducing error by increasing degrees of freedom in the optimization, and include polynomial regression [10], [7], [11], [12], [13], neural networks [14], [15], [16] and look-up tables [17]. The regression can also aim to reduce perceptual rather than colorimetric error [18], by minimizing errors in a perceptually uniform space. Whether colorimetric or perceptual accuracy is more important depends on the situation where either color measurement or pleasing color rendition [19]. In addition to minimizing average characterisation error, a good solution should conform to several important properties. These include: a) smoothness, and the avoidance of abrupt changes or discontinuities in the mapping, b) predictable and stable mapping for all colors, particularly those with high saturation, c) robustness across different illuminants and reflectance types; d) insensitivity to noise [20], e) invariance to linear scaling of inputs (exposure independence). Many of these properties are either not present, or need to be explicitly imposed in higher order methods. [21] incorporates exposure independence into polynomial transforms with reduced error. In addition, [7] show that accurate mapping of the white point can result in improved perceptual errors.

The present invention introduces a new property, hue-plane preservation, and uses it to implement a novel approach for color correction. The method is termed "Hue-plane Preserving Color Correction by Weighted Constrained Matrixing" (HPPCC-WCM). The present invention demonstrates that as well as reducing color correction error, the invention also incorporates important properties such as white point preservation, exposure independence, and smoothness, among others.

In Section II of the detailed description we disclose the mathematical theory of the relation between sensor responses and spectral reflectances in order to explain how properties such as exposure, shading and linearly related spectral stimuli are represented in sensor space coordinates. In Section III, we evaluate how these properties interact with a representative set of mapping methods. We specifically define and develop arguments for the incorporation of hue plane preservation in such methods. In Section IV, our novel approach to hue plane preserving color correction is presented in detail. Results of a comparison between the present method and state-of-the-art methods are presented in Section VI, and these results are further discussed in VII. We conclude in Section VIII.

II. Mathematical Theory of the Invention

Basic methods for optimising color correction methods are well known [22] [3]. A color calibration chart with a number of patches of known XYZ tristimulus values (and sometimes known reflectance spectra) is imaged with a digital camera, taking care to ensure uniform illumination on the target and the removal of stray light. An exposure is chosen to minimize noise. The RGB responses for each patch are recorded in the camera and the parameters of a function are estimated to map RGB values to estimated XYZ values.

A. Color Formation

A model of the image formation process for a given set of sensors, reflectances and illuminant, is given in Equations 1 and 2. In general, sensor responses s to a spectral power distribution $P(\lambda)$ is:

$$s = \int_\lambda P(\lambda)\sigma(\lambda)d\lambda \tag{1}$$

where $\lambda$ is wavelength, $\sigma(\lambda)$ are the spectral filter functions of the sensors and:

$$P(\lambda) = I(\lambda)\rho(\lambda) \tag{2}$$

where $I(\lambda)$ is the illuminant spectral power distribution and $\rho(\lambda)$ is a surface. In case the sensor is a camera, we denote the corresponding sensor responses c. Specifically, in the usual 3 filter case which is relevant here $c=[R, G, B]^T$. In case the sensor is the human standard observer color matching functions, we denote the corresponding responses $x=[X, Y, Z]^T$. In Equation 1 we assume that $\sigma(\lambda)=[w_1\sigma_1(\lambda), w_2\sigma_2(\lambda) w_3\sigma_3(\lambda)]$, where $\sigma_i(\lambda)$ is the $i^{th}$ sensitivity function, $i=(1, 2, 3)$ and $w_i$ represents pre-calculated white-point balancing factors in either RGB or XYZ-space.

B. Characterization Models and Optimization

A characterization model seeks to map device dependent response vectors c, to approximate device independent tri-simulus values $\hat{x}$ with a transformation function $f(\bullet)$:

$$\hat{x} = f(c) \tag{3}$$

Although we refer to XYZ values throughout, any set of tristimulus values can be interchanged.

Generally, and most importantly, $f(\bullet)$ must be error minimizing and is found by:

$$\min_f \sum_{i=1}^{N} \|u(Dx_i) - u(Df(c_i))\|_v \tag{4}$$

where $x_i$ and $c_i$ are the observer and camera responses to the $i^{th}$ of N characterization target patches, u(•) is a color space transformation, and D is an N×N diagonal matrix containing normalized weights for each color $c_i$ that can be employed to bias the minimization towards some colors more than others. v represents some image norm. Most commonly u(•) is the identity function, D is the identity matrix and v=2, for Euclidean distances. Equation 4 then becomes:

$$\min_{f} \sum_{i=1}^{N} \|x_i - f(c_i)\|_2 \quad (5)$$

In the case where $f(•)$ is linear:

$$f(c) = M_{lsq} c \quad (6)$$

where $M_{lsq}$ is a 3×3 matrix. This is known as the standard unconstrained linear least squares solution to Equation 3.

However, u(•) can also be a mapping to a more perceptually uniform space, such as CIELAB (ISO 11664-4:2008 (E)/CIE S 014-4/E:2007) to ensure the perceptual accuracy of the final characterisation [18]. Furthermore, the optimization in Equation 4 can be adapted to incorporate desirable properties, such as white point balancing, through appropriate constraints.

C. Exposure and Shading

The inherent linearity of both the standard observer and the RGB sensor responses to light can readily be seen from Equation 1. This linearity means that scaling by a factor k, caused by a change in exposure or irradiance, will result in an equal change in both responses. The color signal $P(\lambda, k)$ reflected from a surface $\rho(\lambda)$ under illumination $I(\lambda)$ after scaling by k can be represented as:

$$P(\lambda, k) = kI(\lambda)\rho(\lambda) \quad (7)$$

Inserting 7 into Equation 1 yields:

$$s(k) = \int_\lambda \rho(\lambda, k) \sigma(\lambda) d\lambda \quad (8)$$

where the response to the scaled reflectance is s(k). This tells us that the camera response:

$$c(k) = kc \quad (9)$$

is scaled in exactly the same way as the observer response:

$$x(k) = kx \quad (10)$$

We argue that this property of equal scaling, which we refer to as exposure or shading independence, should be maintained by characterization transforms so that:

$$f(kc) = kf(c) \Rightarrow k\hat{x} = f(kc) \quad (11)$$

and therefore any scaled version of a color automatically will be mapped to the appropriately scaled version of the estimated color. Exposure and shading independence in the response estimation, therefore provides an inherent colorimetric accuracy and ensures that the same characterisation is valid if, for example, the scene lighting level changes.

D. Interest Color and White Point Preservation

There are many situations where it is desirable to map particular colors, neutral or chromatic, exactly to their correct XYZ values; for example in cultural heritage, in medical applications, or within photographic practice related to a brand or objects with colors of high importance. Letting u(•) be the identity function henceforth, this is expressed mathematically as solving Equation 4 with the constraint that:

$$f(c_k) = x_k \quad (12)$$

i.e. a $k^{th}$ color $c_k$ must be mapped with no error. We will refer to this property as interest color preservation.

A key property preserved by a number of transforms is the imaging "white-point", which is a specific version of the preservation of interest colors. This can be expressed mathematically as:

$$f(c_W) = x_W \quad (13)$$

where we note that this equation uses $x_W$, which is the exact white-point, rather than $\hat{x}_W$ which would be the approximation to the white point. In the literature this property is referred to as white point preservation and its employment has the perceptually very important consequence that color casts, especially in neutral colours, are avoided.

We note here that while preserving the white-point is important in characterisation, this is not the same as white-point balancing. In the camera characterization pipeline a white point balancing step should be applied independently and before optimisation. Indeed, the optimisation of $f(•)$ has been found to perform best on white balanced color values [3]. Additionally, a separate characterization transform should be built for each illuminant that is encountered, and typically commercial cameras will have multiple characterization functions to apply under different illumination conditions.

E. Hueplane Preservation

Taking white point preservation and exposure and shading independence into consideration, we introduce a more advanced constraint on the transformation. Let the reflectance from an object surface be a linear combination of two spectral reflectances; diffuse reflectance from a surface pigment and a neutral specular reflectance, so that:

$$\rho(\lambda, k_D, k_S) = (k_D \rho_D(\lambda) + k_S) \quad (14)$$

where $\rho(\lambda, k_D, k_S)$, following the principle in Equation 7, is the surface spectral reflectance function expressed as a linear combination of specular reflectance (weighted by the amount $k_S$) and diffuse pigment reflectance $\rho_D(\lambda)$ (weighted by the amount $k_D$). The color signal using Equation 2 will then be:

$$P(\lambda, k_D, k_S) = (k_D P_D(\lambda) + k_S) \quad (15)$$

Inserting Equation 15 into Equation 1 yields:

$$s(k_D, k_S) = k_D (\int_\lambda P_D(\lambda) \sigma(\lambda) d\lambda) + k_S (\int_\lambda I(\lambda) \sigma(\lambda) d\lambda) \quad (16)$$

Equation 16 can be rewritten in terms of integrated responses from the camera:

$$c(k_D, k_S) = k_D C_D + k_S c_S \quad (17)$$

and from the observer:

$$x(k_D, k_S) = k_D x_D + k_S x_S \quad (18)$$

where $C_D$ is the 3-element camera response to the diffuse reflectance component and $c_S$ to the specular component (or light source), $x_D$ is the observer response to the diffuse component and $x_S$ to the specular component. It is assumed here that in practice, the responses to the illuminant are represented by neutral values that are scaled by a factor $k_W$ to within exposure range. We can therefore replace $k_S c_S$ with $k_W c_W$ and $k_S x_S$ with $k_W x_W$ and thus $\rho(\lambda, k_D, k_S)$ with $\rho(\lambda, k_D, k_W)$. It is clear from Equations 17 and 18 that a) both the camera and observer responses to the stimulus $\rho(\lambda, k_D, k_W)$ are the weighted combination of the separate responses to the diffuse and specular components of the color, and b) that the weights $k_D$ and $k_W$ are the same both for camera and observer. By varying $k_D$ and $k_W$ in positive numbers a halfplane in RGB space corresponding to a halfplane in XYZ space is described. We denote these planes Hue Planes. In general terms:

$$k_D f(c_D) + k_W f(c_W) = f(k_D c_D + k_W c_W) \quad (19)$$

and using Equation 3:

$$k_D \hat{x}_D + k_W \hat{x}_W = k_D f(c_D) + k_W f(c_W) \quad (20)$$

A useful way to understand the position and geometry of a hueplane is to project it onto a two-dimensional chromaticity plane in color space. Chromaticity coordinates (r, g) pertaining to camera color c is found by a central projection:

$$r = R/(R+G+B), g = G/(R+G+B) \quad (21)$$

Scaling the color values (R, G, B) by a constant k and inserting this into 21:

$$r = kR/(kR+kG+kB), g = kG/(kR+kG+kB) \quad (22)$$

makes it evident that projections on chromaticity planes are invariant to changes in exposure and shading. Inserting the camera white point $c_W = (R_W, G_W, B_W)$ in Equation 21 gives the neutral point $(r_W, r_W) = (1/3, 1/3)$, The chromaticity point (r, g) and the neutral point $(r_W, g_W)$ will define a half line emanating from the neutral point. This line in turn defines an angle $\phi_c$ by:

$$\phi_c = \text{sign}\left(\frac{v}{C}\arccos\left(\frac{u}{C}\right)\right) + \frac{1}{2}\left(1 - \text{sign}\left(\frac{v}{C}\right)\right) \quad (23)$$

where $\phi_c \in [0; 2\pi]$ and the chroma C is defined as:

$$C = \sqrt{(u^2 + v^2)} \quad (24)$$

and:

$$u = (r - r_W), v = (g - g_W) \quad (25)$$

In colorimetric chromaticity space, a hue plane projection will extend its line from neutral, through the chromatic color to the border of spectrum locus on which a dominant wavelength [2] pertaining to that angle is found. The angle $\phi$ is thus referred to as a hue angle. Combining the linear relations in 20 with white point preservation in Equation 13, we will refer to this property of the mapping defined by Equation 3 as hueplane preservation. Hueplane preservation presupposes white point preservation, exposure and shading independence, but not necessarily vice versa.

The idea of hueplane preservation owes its inspiration to the spectral properties and thus colorimetry of real scenes in which 3-dimensional objects exist with uniform, or near-uniform, diffuse reflectance linearly combined with an amount of (neutral) specular reflectance. In computer graphics this is known as the Phong reflection model [23], [24], and ambient lighting is assumed to have the spectral composition of the illumination as used in Equation 14. The benefit of hueplane preservation in this case is that if the diffuse color is corrected without error, or low error, all other colors from that object are automatically mapped accordingly with no or low error. It is important to note that a hue plane is correlated to perceptual hue by dominant wavelength. This means that a hue plane does not necessarily contain perceptually uniform hue over its surface, just as an object with Phong modelled reflection is not necessarily perceived to have a uniform hue.

III. Reference Examples

A. Linear Regression

Adding a white-point preserving constraint defined in Equation 13 to the linear solution in Equation 5, the white point preserving linear least squares solution becomes:

$$\hat{x} = M_l c \text{ subject to } M_l c_W = x_W \quad (26)$$

We will refer to this as the linear method (LIN). Applying LIN to hue plane preservation defined in Equation 19:

$$k_D M_l c_D + k_W M_l c_W = M_l (k_D c_D + k_W c_W) \quad (27)$$

reveals that $M_l$ is indeed hue plane preserving. The drawback of the LIN method is the comparatively low accuracy of the estimations, mainly caused by the low number of degrees of freedom in the matrix, having only 9 coefficients of which 3 are occupied by the white point preservation, which means that only 2 hueplanes can be mapped exactly.

B. Polynomial Regression

In order to enhance the accuracy found in the linear approach a higher order function $f(\bullet)$ can be employed while retaining white point preservation. The typical polynomial approach to color correction maps a polynomial expansion of the device RGB values to estimated XYZ. A standard $2^{nd}$ order polynomial expansion [21] of c becomes $c^{(2)}$:

$$c^{(2)} = [R, G, B, R^2, G^2, B^2, RG, RB, BG]^T \quad (28)$$

and a $3^{rd}$ order polynomial expansion of c adds third order elements to $c^{(2)}$:

$$c^{(3)} = [c^{(2)T}, R^3, R^2 G, R^2 B, G^3, G^2 R, G^2 B, B^3, B^2 R, B^2 G, RGB]^T \quad (29)$$

Either way, the white point preserving polynomial mapping function becomes:

$$\hat{x} = M_{pol} c^{(q)} \text{ subject to } M_{pol} c_W^{(q)} = x_W \quad (30)$$

where $M_{pol}$ is a 3×9 matrix if q=2 and a 3×19 matrix if q=3. We will refer to the polynomial mappings as POL2 and POL3.

Applying POL2 and POL3 to the color signal c in Equation 19, it is clear that the higher order elements will prevent hue plane preservation, as well as exposure and shading independence. This is also true for neural-network approaches, or any other non-linear models where exposure independence and linearity are not explicitly factored in. As such these methods are only useful for a fixed imaging set up, e.g. when imaging objects in the laboratory under a fixed light source.

C. Root Polynomial Regression

Finlayson et al. have proposed expansions based on root polynomials that conform to exposure independence, with promising results in colorimetric accuracy.

A $2^{nd}$ order root polynomial will have the 6 components [21]:

$$c^{(1/2)} = \left[ R \quad G \quad B \quad \sqrt[2]{RG} \quad \sqrt[2]{RB} \quad \sqrt[2]{BG} \right]^T \quad (31)$$

while a $3^{rd}$ order root polynomial will have the 13 components:

$$c^{(1/3)} = \quad (32)$$

$$\left[ c^{(1/2)T} \quad \sqrt[3]{R^2 B} \quad \sqrt[3]{R^2 G} \quad \sqrt[3]{G^2 R} \quad \sqrt[3]{G^2 B} \quad \sqrt[3]{B^2 R} \quad \sqrt[3]{B^2 G} \quad \sqrt[3]{RGB} \right]^T.$$

Inserting $c^{(1/2)}$ or $c^{(1/3)}$ into Equation 5 gives:

$$\hat{x} = M_{rpol} c^{(1/q)} \text{ subject to } M_{rpol} c_W^{(1/q)} = x_W \quad (33)$$

We will refer to the root polynomial mapping methods as RPOL2 and RPOL3. Applying RPOL2 and RPOL3 to the color signal c in Equation 19 reveals that by setting either $k_D=0$ or $k_W=0$ the function $f(\bullet)$ is exposure and shading independent, but that the higher order terms exclude hue plane preservation.

We expect that the inability to preserve hue planes in these higher order methods, e.g. for RPOL and POL, will have an impact on very saturated colors. In particular we expect that the lower the order, the less curvature and the less accuracy ($1^{st}$ order polynomial is identical to the low accuracy 3×3 matrix), whereas higher orders may fit extreme values poorly [25]. We demonstrate this in Section VII-C.

D. Enhanced Hue Plane Preserving Matrixing

In order to increase the number of degrees of freedom in the mapping function $f(\bullet)$, but retain hue plane preservation and the fundamental technique of using 3×3 matrices, Find Andersen and Hardeberg [26] constructed a piecewise linear method using multiple white point preserving matrices. To define the matrices, they impose interest point preservation on the training colors. So for any pair of characterisation patches in a $j^{th}$ interval $c_j$ and $C_{j+1}$, where j indicates a rank in terms of increasing camera hue, a hue interval delimited subregion of camera color space is created between $\phi_j$ and $\phi_{j+1}$. A matrix $M_3$ in that interval is found such that:

$$M_j c_W = x_W \text{ and } M_j c_j = x_j \text{ and } M_j c_{j+1} = x_{j+1} \quad (34)$$

where there are as many matrices as training colors. For a generic device color c the appropriate color correction matrix $M_k$ is then chosen such that the hue of c falls between the hue values of $\phi_k$ and $\phi_{k+1}$. The correction result will still only be approximate for colors that do not belong to the characterization target. They term this approach "hue-plane preserving color correction" (HPPCC).

Increasing the number of free parameters in the color correction by using multiple matrices allows significantly decreased error compared to a single 3×3 matrix. But this method has drawbacks in that smoothness beyond $C^0$ is not ensured and the method doesn't leave room for optimization except by manually choosing characterization patches. This choice of color patches makes the estimation error sensitive in areas of the color space, defined by the data set, with a high level of metamerism.

IV. The Weighted Constrained Matrixing Method

In this section we outline our novel approach to color characterization, which ad-dresses the above issues directly. Our method is motivated by the drive to ensure the characterization is hueplane preserving and thus exposure independent and white point preserving and crucially, error minimizing. We call this method "HuePlane Preserving Color Correction by Weighted Constrained Matrixing" (HP-PCC-WCM).

The present work extends the initial HPPCC idea by changing the mapping from piecewise linear to differentiably continuous($C^\infty$). This entails preserving smoothness in the transformation between physically smooth color transitions recorded by the camera and equally smooth color transitions recorded by the observer. The only place in color space in which this method may be reduced to C0 continuity is in passing the neutral axis. But since neither hue nor saturation are perceptually present there, no abrupt perceptual color shifts can occur there. Like the standard polynomial method presented in the previous section, HPPCC-WCM employs only one user controlled parameter that directly relates to the order of differentiability limited by the number of training colors.

The estimated color $\hat{x}$ corresponding to c is, for the HPPCC-WCM method, given by:

$$\hat{x} = M(\phi_c, p) c \quad (35)$$

Given the device color c from which a device hue angle $\phi_c$ is derived by Equation 23, the corresponding transformation matrix $M(\phi_c, p)$ is found as the normalized power function weighted sum of all precalculated matrices $M_i$ for $i \in [1: N]$, each corresponding to a training color $c_i$. The parameter p refers to the order of the weighting power function: To obtain $M(\phi_c, p)$ the N constrained 3×3 matrices $M_i$ for each training color $c_i$, are thus found by equation constrained least squares regression:

$$\min_{M_i} \sum_{i=1}^{N} \|M_i c_i - x_i\| \quad (36)$$

subject to the constraints of white point preservation and interest color preservation of training color c, as defined in Equations 13 and 12:

$$M_i c_W = x_W \text{ and } M_i c_i = x_i \quad (37)$$

The N matrices $M_i$ are weighted as a function of hue angle $\phi_c$ and each of the N training color hue angles $\phi_i$. The weighting function $w(\bullet)$ is defined as a power function of order p of hue angle differences:

$$w(\phi_i) = (\pi - \Delta\phi_i)^p \quad (38)$$

where the $i^{th}$ hue angle difference $\Delta\phi_i = \min(|\phi_c - \phi_i|, 2pi-1 (\phi_c - \phi_i|)$. Finally, $M(\phi_c, p)$ in Equation 35 is calculated as the normalized weighted sum:

$$M(\phi_c, p) = \frac{1}{\sigma_w} \sum_{i=1}^{N} w(\phi_i) M_i \quad (39)$$

where:

$$\sigma_w = \sum_{i=1}^{N} w(\phi_i) \quad (40)$$

Letting p go towards infinity for $\phi = \phi_i$ will force $M(\phi, p)$ to go towards $M_i$ and generally make matrix influence become very local to matrices pertaining to hues that are extremely close to the hue of the color to be mapped. Letting p=0 will put equal weight on all $M_i$ and thus approach the solution calculated by Equation 13. By varying p the estimation in Equation 35 can be optimized for accuracy.

Figure 5:
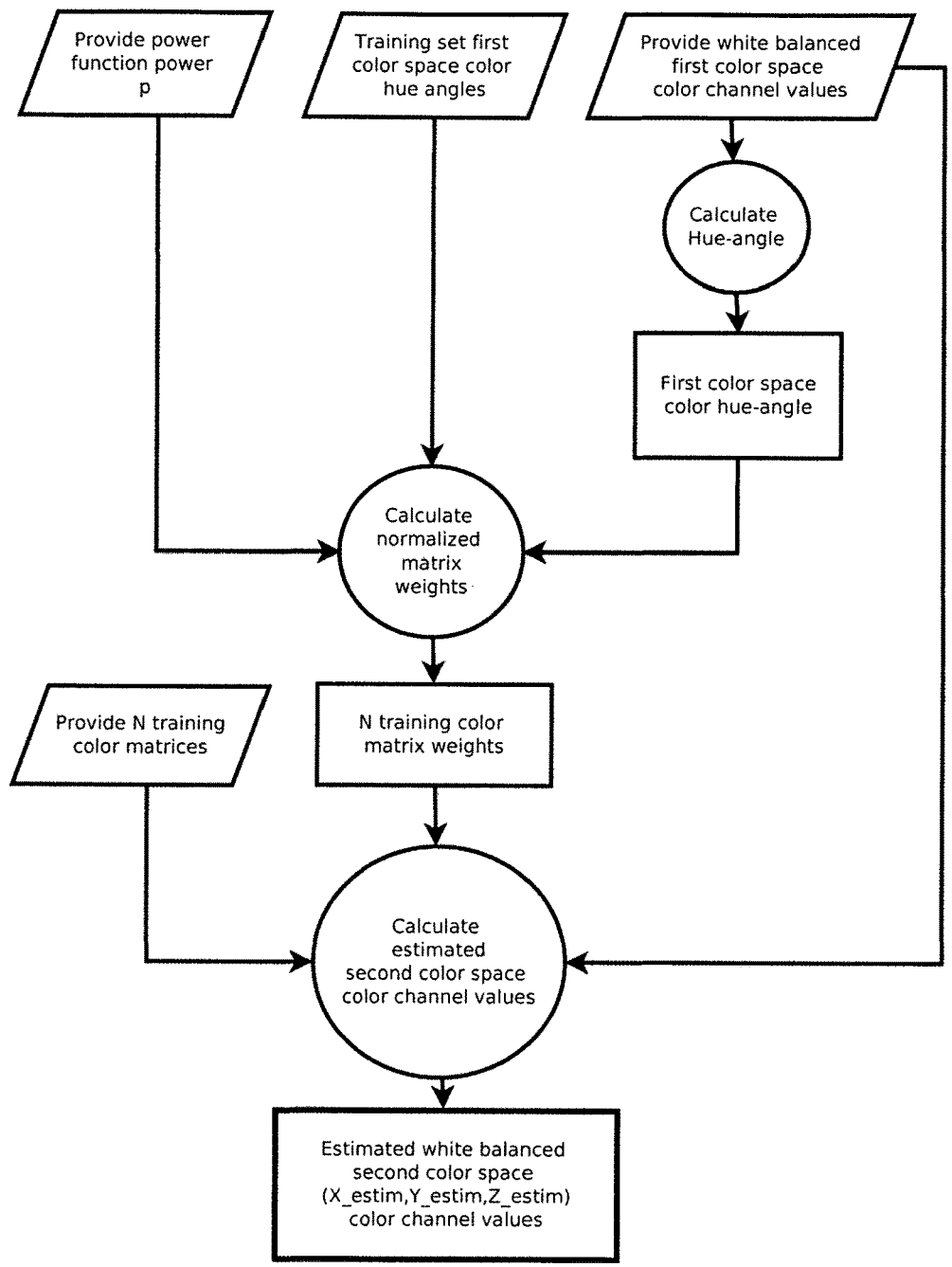
FIG. 5 illustrates a method wherein the set of parameters is a weighting power function of power p.

Using the HPPCC-WCM method is illustrated in FIG. 5. In the figure the provided white balanced first color space color channel values are c and it's corresponding first color space color hue angle is $\phi_c$. The training set first color space color hue angles are $\phi_i$. The power function power is p. The N training color matrix weights are $w(\phi_i)$ and the N training color matrices are $M_i$. The estimated white balanced second color space $(X_{estim}, Y_{estim}, Z_{estim}) = \hat{x}$.

V. Equation Constrained Least Squares Regression Method

In order to obtain the linear least squares solution to Equations 5, 6, 30, 33 and 36, subjected to particular constraints, we begin by expressing the constraints as a set of linear equations:

$$E\vec{m} = \vec{x}_e \quad (41)$$

where $\vec{m}_{i+3(j-1)} = m_{j,i}$, for $i\epsilon[1:3]$ and $j\epsilon[1:3]$, is a 9×1 vector representation of M. E is a 3k×9 matrix containing the constraints corresponding to k interest color preservations, where E=0 except for $e_{j+3(k-1),3(j-1)+i} = c_i^k$ and $\vec{x}_{i+3(k-1)} = x_i^k$, in which case $c^k$ and $x_e^k$ are the camera and colorimetric values for a $k^{th}$ constraint. These constraints are imposed on the linear optimization of the color mapping:

$$P\vec{m} = \vec{x} \quad (42)$$

where P is a 3N×9 matrix where P=0 except for $p_{j+3(k-1),3(j-1)+i} = c_i^k$ and $\vec{x}_{i+3(k-1)} = x_i^k$, and again $c^k$ and $x^k$ are the camera and colorimetric values for a $k^{th}$ training color.

To solve this system we use the method in [27], which is an equation constrained linear least squares solving method based on Lagrange multipliers λ. That is, we minimize:

$$\min_{E\vec{m} = \vec{x}_e} \|P\vec{m} - \vec{x}\|_2 \quad (43)$$

by using the unique solution to:

$$\begin{pmatrix} \hat{\vec{m}} \\ \hat{\lambda} \end{pmatrix} = B^{-1} \begin{pmatrix} P^T \vec{x} \\ \vec{x}_e \end{pmatrix} \quad (44)$$

where:

$$B = \begin{bmatrix} P^T P & E^T \\ E & 0 \end{bmatrix} \quad (45)$$

VI. Examples

A. Optimising p

Figure 1:
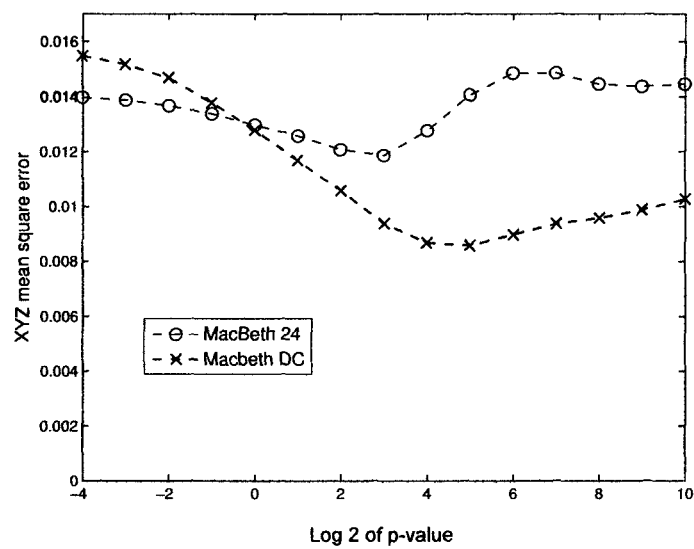
FIG. 1 illustrates X,Y,Z estimation error plotted as a function of power function p for two different datasets using a leave-one-out training method illustrated in FIG. 4. Graphs illustrate for Macbeth 24 and Macbeth DC color checker charts, respectively, X,Y,Z mean square error as a function of weighting function power p value. Macbeth 24 data illustrated by dash-circles (-o-), and Macbeth DC data illustrated by dash-crosses (-x-).

The method uses a single parameter, p, which defines the weighting given to each training matrix. Given that there is no analytical solution for p, it must be optimized numerically for a set of training patches. FIG. 1 shows average XYZ error for different values of p using a leave-one-out (LOO) testing regime for two different characterisation targets; the Macbeth ColorChecker (MbCC) with 24 patches, and the Macbeth ColorChecker DC (MbDC) with 238 patches. The LOO test we use here is employed to give a first hand quantification of how well a given method generalizes its performance on a given data set. Each method is trained and tested on a particular set of colors from a chart of N patches. N times the method is trained on N−1 patches and tested on the remaining $N^{th}$ patch by calculating the mean square error for that patch. This is repeated for all N patches. The N mean square errors are averaged to give a total error which indicates the performance of the method.

Given that colors close to the neutral axis are already mapped accurately by white point preservation in our method and that only one shade (preferably the one with highest reflectance) of each training color is needed to define each hueplane, we only use chromatic patches to generate training matrices. For the MbCC chart we use the 18 non-neutral patches, while for the MbDC chart we use a chroma threshold (see Equation 24) to remove all non-neutral patches; a value of 0.05 was found to be most effective, leaving 127 matrices. Training error was then evaluated on all patches, chromatic and neutral. When the color to be "left out" is one of the chromatic training patches, only the remaining training patches (17 and 126 for the MbCC and MbDC respectively)—are used to to train the method. The results show that the optimal value of p falls at different values for the different datasets.

Figure 4:
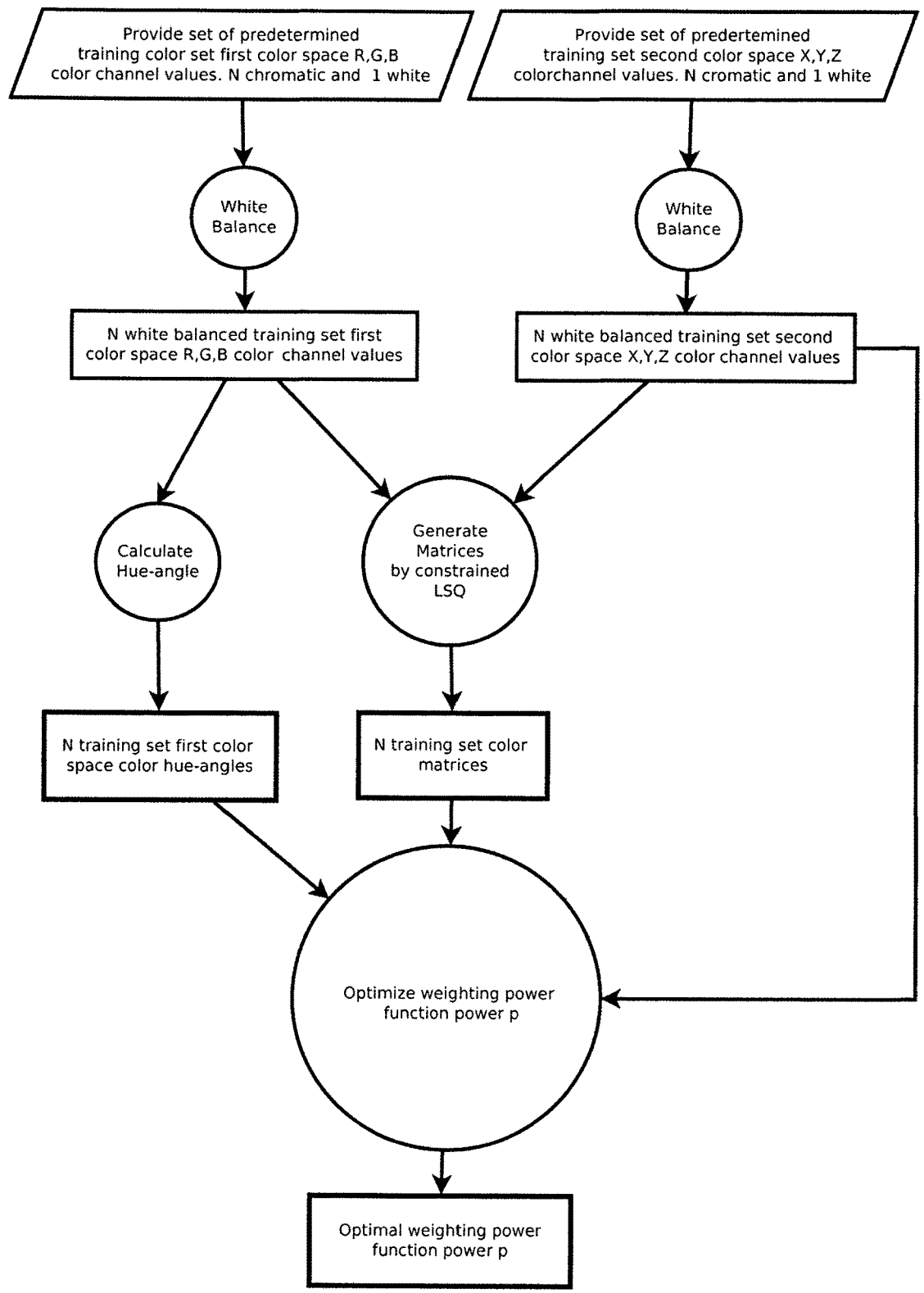
FIG. 4 illustrates method steps associated with training the HPPCC-WCM (Hue-plane preserving color correction by weighted constrained matrixing) method by optimizing the parameters of the parameter set dependent differential weighting function pertaining to a chosen training color set. Provided data, calculations and results are illustrated in the figure.
  i) Provide a set of predetermined training color set first color space R,G,B color channel values, N chromatic colors and 1 white color.
  ii) Calculate N white balanced training color set first color space R,G,B color channel values by per channel dividing the color channel value of each chromatic color with the white color.
  iii) Obtaining N white balanced training set first color space R,G,B color channel values.
  iv) Calculate each first color space training set color hue-angle.
  v) Obtain N training set first color space color hue-angles final data.
  vi) Provide a set of predetermined training color set second color space X,Y,Z color channel values, N chromatic colors and 1 white color.
  vii) Calculate N white balanced training color set color space X,Y,Z color channel values by per channel dividing the color channel value of each chromatic color with the color channel value of the white.
  viii) Obtain N white balanced training set second color space X,Y,Z color channel values.
  ix) Calculate matrices by constrained least squares regression (LSQ).
  x) Obtain N 3 by 3 training set color matrices final data, each matrix being specific for each corresponding training color.
  xi) Calculate optimized parameters of a parameter set dependent and hue-angle dependent, differential weighting function, such as a weighting power function of power p, by constrained linear or non-linear regression, by employing, for example, a "Leave-One-Out" optimization training method paradigm.
  xii) Obtain final data in the form of a parameter set dependent and hue-angle dependent, differential weighting function, such as, but not limited to, an optimal weighting power function of power p.

To find an optimal value for p, we could use non-linear numerical optimization to minimize least-squares XYZ error for a given imaging set up and set of training data. This approach is illustrated in FIG. 4 (where each of the N white balanced training set first color space R,G,B color channel values corresponds to a c and each of the N white balanced training set second color space X,Y,Z color channel values corresponds to a x). In a practical setting, this value would only need to be computed once for a fixed characterisation mapping; here we minimize LOO error to do this. For a number of preselected p-values we calculate the LOO error. The p-value associated with the lowest LOO error is chosen. Table I shows optimal p values averaged for 31 different cameras, 3 illuminants, and two characterisation charts. The overall shape of both curves suggests global minima where the optimal p-values are found. As above, there is large variability between the two characterisation charts, but for each chart the variability across illuminant and cameras is relatively small. Indeed, if the mean value of p is used for all cameras rather than optimising for each, there is a drop in performance of less than 0.05 ΔE. In later results, for a fair comparison with other methods, a single p value is used over all cameras for a given illuminant.

B. Training and Testing

To test our methods in a realistic characterisation setting we use recognised calibration charts as training data; here we use the (MbCC) and (MbDC) charts, to evaluate performance on different sized training sets. To choose optimal p, we minimize LOO

TABLE I

OPTIMISED VALUES FOR p

| | MbCC | | | MbDC | | |
|---|---|---|---|---|---|---|
| | Mean | Min | Max | Mean | Min | Max |
| D65 | 10.65 | 5.09 | 15.47 | 32.38 | 22.37 | 85.58 |
| A | 10.81 | 2.46 | 21.37 | 64.32 | 40.56 | 101.97 |
| F11 | 4.27 | 2.29 | 11.21 | 38.82 | 27.68 | 60.43 | error separately for each chart. In the flowchart in FIG. 6 it is illustrated how the method performance evaluation based on the estimation of perceptual color differences is applied to one or more white balanced test set color channel values. As testing data we use carefully chosen reflectance datasets to represent different types of possible spectra: 1) Munsell reflectances [28] as an example of man-made spectra; 2) the Esser TE221 test chart as an example of challenging man-made spectra (the Esser chart contains some very high chroma colors); 3) natural spectral from Foster et al. [29]; 4) colors generated on the same hue-plane as training patches, using the Phong shading model. For this hue-planes set, reflectances are sampled at equally spaced intervals on a triangular grid in reflectance space, where the triangle is anchored by the perfect reflecting diffuser, black point, and the reflectance of the color in question. This simulates the situation where uniformly colored, diffusely and specularly reflecting, 3D object is photographed under the imaging illuminant.

The data are synthesized according to Equation 1. We use synthesized data for two reasons: a) because the responsivity of CCD sensitivity is well understood [30] and hence Equation 1 provides an accurate model of real data, and b) because it allows us to test the method on a large number of different cameras and spectral datasets. In our experiments RGB values are generated for 31 different cameras, 28 from [31] and 3 from [32], under three representative illuminants (D65, A, F11). Mean, median and maximum values are computed over all reflectances in each set and all cameras.

Tables II and IV show results for LOO error evaluation using the MbCC and MbDC charts respectively. Results show the mean, median and max CIELab error over 31 cameras, and under three illuminants. The methods compared are: linear white-point preserving matrix (LIN), polynomial (POL), root polynomial (RPOL) and HPPCC-WCM, where all methods include white point preservation. Tables III and V show results for a realistic training/testing situation, using the MbCC and MbDC charts respectively as training data, and 4 test reflectance sets. For each table the best performing method is highlighted in bold for each illuminant and error metric.

Figure 2:
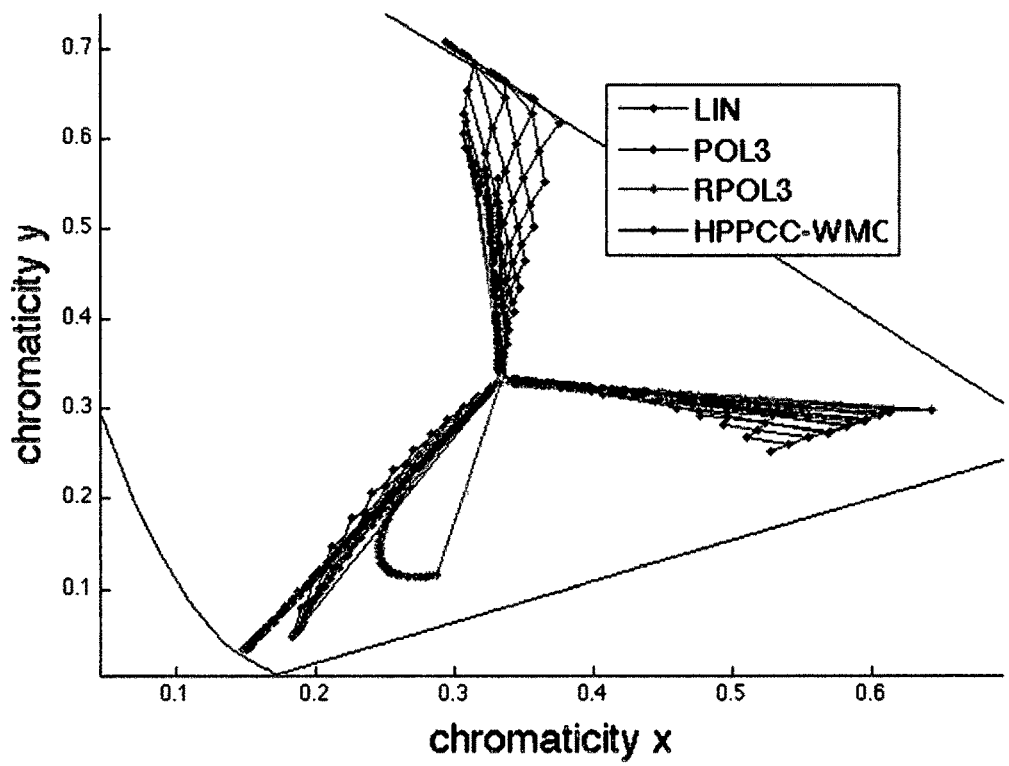
FIG. 2 is an illustration of visualisations of hue planes outputs. a) shows constant hue planes in RGB on an CIE xy chromaticity diagram, b) shows a hue plane generated from a chromatic patch taken from the Esser data (see text for details). Curvature imposed by the POL3 and RPOL3 methods is clearin each case.
Figure 2:
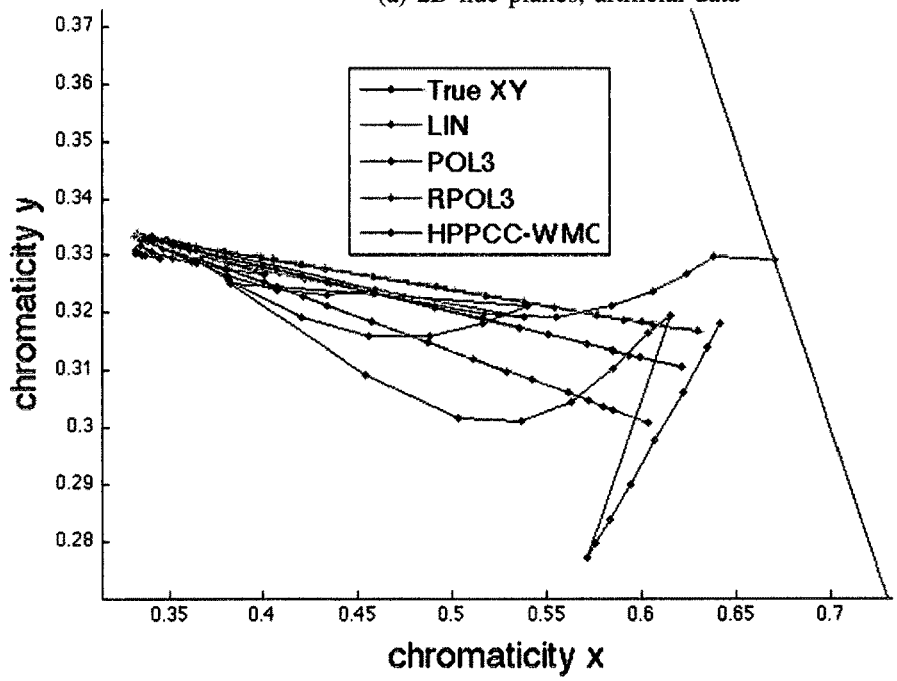
Figure 3:
FIG. 3 illustrates figure symbols used in the method steps illustrated in FIGS. 4, 5 and 6. Oblique boxes illustrate provided input data. Circles illustrate calculations being performed. Thin rectangular boxes illustrate intermediate results, and thick rectangular boxes illustrate final results.
Figure 3:
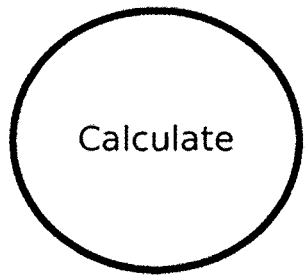
Figure 3:
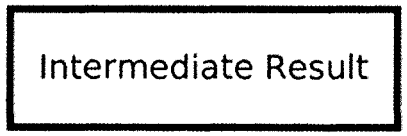
Figure 3:
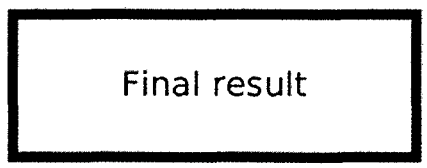

FIG. 2 demonstrates the effect of the different methods on hue-planes. In FIG. 2 a) and b) XYZ and xy values are shown respectively for RGB planes passed through the RGB to XYZ conversion. In FIG. 2c) true xy chromaticities for a hue plane derived from a chromatic Esser patch are plotted against estimations from four different approaches.

TABLE II

CIELAB ΔE ERROR (MEAN, MEDIAN AND MAX) USING LEAVE-ONE-OUT TESTING PARADIGM FOR EACH METHOD, WITH RESULTS AVERAGED OVER 31 CAMERAS; REFLECTANCE SET: MACBETH 24 PATCH COLORCHECKER, ALL ILLUMINANTS

| Method | D65 | | | A | | | F11 | | |
|---|---|---|---|---|---|---|---|---|---|
| | Mean | Median | Max | Mean | Median | Max | Mean | Median | Max |
| LIN | 1.9 | 1.4 | 29.3 | 2.3 | 1.5 | 28.8 | 1.5 | 1.1 | 18.8 |
| POL2 | 2.6 | 1.6 | 23.3 | 3.1 | 1.7 | 39.7 | 2.3 | 1.2 | 23.0 |
| POL3 | 3.2 | 1.7 | 59.6 | 4.2 | 2.4 | 67.0 | 2.7 | 1.5 | 35.8 |
| RPOL2 | 1.9 | 1.1 | 20.2 | 2.4 | 1.3 | 29.5 | 1.8 | 1.1 | 17.5 |
| RPOL3 | 3.9 | 2.0 | 82.6 | 5.3 | 2.8 | 91.2 | 4.9 | 1.7 | 68.6 |
| HPPCC-WCM (8.6) | 1.7 | 1.0 | 23.2 | 2.2 | 1.3 | 40.7 | 1.4 | 0.8 | 13.8 |

Table VI shows the effect of adding noise to sensor outputs on test data (noise in training data is generally minimal due to averaging responses over training patches). Here we add both dark noise and shot noise; dark noise is modelled as zero mean Gaussian noise distributed N(0, 0.01), and shot noise as an approximation to Poisson noise using Gaussian noise whose standard deviation is scaled by the sensor intensity, i.e. for a sensor response $c_i$ the noise has distribution $N(0, 0.02c_i)$.

VII. Discussion

A. Stability and Overtraining

The stability of the methods relates to the ability to resist over-training, and maintain reasonable outputs for unseen testing data.

An initial idea of stability can be seen in the LOO results of Tables II and IV. For the MbCC chart both the RPOL3 and POL3 methods produce worse results than

TABLE III

CIELAB ΔE ERROR (MEAN MEDIAN AND MAX) FOR A RANGE OF TEST SETS AFTER TRAINING ON MACBETH 24 PATCH COLORCHECKER. RESULTS ARE AVERAGED OVER 31 CAMERAS, AND PRESENTED FOR THREE DIFFERENT IMAGING ILLUMINANTS

| | | Method | D65 | | | A | | | F11 | | |
|---|---|---|---|---|---|---|---|---|---|---|---|
| | | | Mean | Median | Max | Mean | Median | Max | Mean | Median | Max |
| Training | | | | | | | | | | | |
| MbCC (N = 24) | | LIN | 1.7 | 1.2 | 22.1 | 2.1 | 1.3 | 22.9 | 1.4 | 0.9 | 15.5 |
| | | POL2 | 1.5 | 1.0 | 16.8 | 1.7 | 1.2 | 15.5 | 1.3 | 0.9 | 10.1 |
| | | POL3 | 0.3 | 0.2 | 4.2 | 0.4 | 0.2 | 4.8 | 0.2 | 0.1 | 3.3 |
| | | RPOL2 | 1.3 | 0.8 | 11.3 | 1.6 | 0.9 | 16.0 | 1.2 | 0.7 | 10.7 |
| | | RPOL3 | 0.7 | 0.5 | 7.4 | 0.9 | 0.6 | 9.6 | 0.8 | 0.7 | 4.9 |
| | | HPPCC-WCM(8.6) | 1.0 | 0.6 | 16.0 | 1.3 | 0.7 | 22.8 | 0.9 | 0.5 | 9.8 |
| Testing | | | | | | | | | | | |
| Esser (N = 264) | | LIN | 2.8 | 1.6 | 47.6 | 3.0 | 1.8 | 45.9 | 2.4 | 1.4 | 39.1 |
| | | POL2 | 2.6 | 1.4 | 38.6 | 3.2 | 1.7 | 46.0 | 2.4 | 1.2 | 56.2 |
| | | POL3 | 6.6 | 2.4 | 305.7 | 7.2 | 2.5 | 266.9 | 5.7 | 2.1 | 167.7 |

TABLE III-continued

CIELAB ΔE ERROR (MEAN MEDIAN AND MAX) FOR A RANGE OF TEST SETS AFTER TRAINING ON MACBETH 24 PATCH COLORCHECKER. RESULTS ARE AVERAGED OVER 31 CAMERAS, AND PRESENTED FOR THREE DIFFERENT IMAGING ILLUMINANTS

|  | Method | D65 Mean | D65 Median | D65 Max | A Mean | A Median | A Max | F11 Mean | F11 Median | F11 Max |
|---|---|---|---|---|---|---|---|---|---|---|
|  | RPOL2 | 1.9 | 1.1 | 35.0 | 2.4 | 1.2 | 53.2 | 2.1 | 0.9 | 37.3 |
|  | RPOL3 | 4.2 | 1.4 | 238.8 | 5.8 | 1.9 | 193.8 | 3.6 | 1.4 | 218.5 |
|  | HPPCC-WCM(8.6) | 2.0 | 1.1 | 39.0 | 2.4 | 1.4 | 45.8 | 1.7 | 1.0 | 39.1 |
| Munsell (N = 1269) | LIN | 1.5 | 0.9 | 45.9 | 1.7 | 1.0 | 48.8 | 1.4 | 0.8 | 30.1 |
|  | POL2 | 1.3 | 0.9 | 30.3 | 1.5 | 0.9 | 63.1 | 1.2 | 0.7 | 16.1 |
|  | POL3 | 3.1 | 1.5 | 231.5 | 3.3 | 1.5 | 194.7 | 3.1 | 1.5 | 231.5 |
|  | RPOL2 | 1.1 | 0.7 | 40.9 | 1.3 | 0.8 | 49.1 | 1.1 | 0.6 | 15.2 |
|  | RPOL3 | 1.4 | 0.8 | 81.2 | 1.8 | 0.9 | 51.1 | 1.4 | 0.8 | 81.2 |
|  | HPPCC-WCM(8.6) | 1.3 | 0.7 | 46.8 | 1.6 | 0.8 | 61.9 | 1.2 | 0.6 | 29.1 |
| Natural (N = 4871) | LIN | 2.1 | 1.3 | 49.7 | 2.4 | 1.3 | 53.2 | 2.2 | 1.2 | 40.7 |
|  | POL2 | 2.1 | 1.4 | 104.3 | 2.3 | 1.3 | 151.7 | 1.9 | 1.2 | 53.5 |
|  | POL3 | 3.7 | 1.5 | 1010.5 | 4.0 | 1.4 | 480.0 | 4.1 | 1.2 | 895.1 |
|  | RPOL2 | 2.1 | 1.3 | 43.0 | 2.4 | 1.4 | 59.1 | 1.9 | 1.2 | 27.2 |
|  | RPOL3 | 2.4 | 1.5 | 173.1 | 3.1 | 1.9 | 103.7 | 2.0 | 1.4 | 64.8 |
|  | HPPCC-WCM(8.6) | 2.1 | 1.3 | 49.7 | 2.4 | 1.3 | 76.1 | 1.9 | 1.1 | 40.7 |
| Hue planes (N = 810) | LIN | 0.8 | 0.4 | 22.1 | 0.9 | 0.5 | 22.9 | 0.8 | 0.5 | 15.3 |
|  | POL2 | 0.9 | 0.6 | 20.9 | 1.0 | 0.6 | 21.3 | 0.9 | 0.7 | 11.8 |
|  | POL3 | 2.5 | 1.22 | 111.7 | 2.5 | 1.8 | 48.9 | 2.5 | 1.3 | 104.6 |
|  | RPOL2 | 0.7 | 0.4 | 11.4 | 0.8 | 0.4 | 16.0 | 0.8 | 0.6 | 10.7 |
|  | RPOL3 | 0.7 | 0.4 | 42.2 | 0.9 | 0.5 | 28.0 | 0.8 | 0.6 | 18.0 |
|  | HPPCC-WCM(8.6) | 0.4 | 0.1 | 16.0 | 0.5 | 0.2 | 22.8 | 0.5 | 0.4 | 9.8 |

TABLE IV

CIELAB ΔE ERROR (MEAN, MEDIAN AND MAX) USING LEAVE-ONE-OUT TESTING PARADIGM, WITH RESULTS AVERAGED OVER 31 CAMERAS USING THREE IMAGING ILLUMINANTS

| Method | D65 Mean | D65 Median | D65 Max | A Mean | A Median | A Max | F11 Mean | F11 Median | F11 Max |
|---|---|---|---|---|---|---|---|---|---|
| LIN | 1.6 | 0.9 | 36.4 | 1.7 | 0.8 | 33.6 | 1.4 | 0.6 | 23.9 |
| POL2 | 1.2 | 0.7 | 28.4 | 1.3 | 0.7 | 24.9 | 1.1 | 0.6 | 15.7 |
| POL3 | 0.9 | 0.5 | 22.5 | 1.0 | 0.5 | 20.6 | 0.9 | 0.4 | 11.7 |
| RPOL2 | 1.0 | 0.6 | 28.1 | 1.1 | 0.6 | 29.3 | 0.9 | 0.5 | 24.4 |
| RPOL3 | 0.8 | 0.5 | 24.9 | 0.9 | 0.5 | 23.4 | 0.7 | 0.3 | 12.5 |
| HPPCC-WCM(45.2) | 0.9 | 0.5 | 30.2 | 1.0 | 0.5 | 32.4 | 0.8 | 0.3 | 24.8 |

RPOL2 and POL2 respectively, which suggests overtraining. In this case, there are 24 colored training patches (with 19 distinct chromaticities) and 19 and 14 degrees

TABLE V

CIELAB ΔE ERROR (MEAN, MEDIAN AND MAX) FOR A RANGE OF TEST SETS AFTER TRAINING ON MACBETH DC COLORCHECKER (238 PATCHES). RESULTS ARE AVERAGED OVER 31 CAMERAS, WITH 3 DIFFERENT IMAGING ILLUMINANTS.

|  | Method | D65 Mean | D65 Median | D65 Max | A Mean | A Median | A Max | F11 Mean | F11 Median | F11 Max |
|---|---|---|---|---|---|---|---|---|---|---|
| Training |  |  |  |  |  |  |  |  |  |  |
| MbDC (N = 238) | LIN | 1.6 | 0.9 | 35.5 | 1.7 | 0.8 | 32.0 | 1.3 | 0.6 | 23.4 |
|  | POL2 | 1.2 | 0.7 | 28.1 | 1.2 | 0.6 | 24.7 | 1.0 | 0.6 | 15.5 |
|  | POL3 | 0.8 | 0.4 | 21.7 | 0.9 | 0.5 | 20.0 | 0.8 | 0.4 | 11.3 |
|  | RPOL2 | 0.9 | 0.6 | 25.9 | 1.0 | 0.6 | 24.7 | 0.9 | 0.5 | 21.5 |
|  | RPOL3 | 0.7 | 0.5 | 19.3 | 0.8 | 0.4 | 17.4 | 0.6 | 0.3 | 8.4 |
|  | HPPCC-WCM (45.2) | 0.8 | 0.5 | 19.1 | 0.8 | 0.4 | 22.96 | 0.7 | 0.3 | 12.4 |
| Testing |  |  |  |  |  |  |  |  |  |  |
| Esser (N = 264) | LIN | 2.9 | 1.7 | 45.9 | 3.2 | 2.0 | 57.1 | 2.5 | 1.6 | 35.1 |
|  | POL2 | 2.6 | 1.4 | 53.6 | 3.1 | 1.6 | 75.8 | 2.3 | 1.3 | 38.5 |
|  | POL3 | 2.0 | 1.2 | 35.6 | 2.5 | 1.5 | 52.5 | 2.0 | 1.2 | 37.2 |
|  | RPOL2 | 2.3 | 1.1 | 38.1 | 2.8 | 1.3 | 61.5 | 2.4 | 1.0 | 38.3 |

TABLE V-continued

CIELAB ΔE ERROR (MEAN, MEDIAN AND MAX) FOR A RANGE OF TEST SETS
AFTER TRAINING ON MACBETH DC COLORCHECKER (238 PATCHES). RESULTS
ARE AVERAGED OVER 31 CAMERAS, WITH 3 DIFFERENT IMAGING ILLUMINANTS.

|  | Method | D65 | | | A | | | F11 | | |
|---|---|---|---|---|---|---|---|---|---|---|
|  |  | Mean | Median | Max | Mean | Median | Max | Mean | Median | Max |
|  | RPOL3 | 2.7 | 1.0 | 106.6 | 3.2 | 1.2 | 137.5 | 2.9 | 1.0 | 93.2 |
|  | HPPCC-WCM (45.2) | 1.7 | 1.0 | 34.8 | 1.9 | 1.2 | 37.3 | 1.6 | 1.0 | 38.8 |
| Munsell (N = 1269) | LIN | 1.4 | 0.8 | 29.5 | 1.8 | 0.9 | 26.1 | 1.4 | 0.7 | 18.8 |
|  | POL2 | 1.2 | 0.9 | 24.4 | 1.3 | 0.8 | 24.4 | 1.1 | 0.7 | 12.3 |
|  | POL3 | 1.0 | 0.7 | 23.5 | 1.1 | 0.8 | 23.1 | 1.0 | 0.7 | 14.3 |
|  | RPOL2 | 1.0 | 0.6 | 21.2 | 1.1 | 0.7 | 23.3 | 1.0 | 0.6 | 17. |
|  | RPOL3 | 0.9 | 0.5 | 17.2 | 1.0 | 0.6 | 16.2 | 0.9 | 0.5 | 11.6 |
|  | HPPCC-WCM (45.2) | 1.1 | 0.6 | 50.1 | 1.2 | 0.7 | 68.3 | 1.0 | 0.6 | 46.4 |
| Natural (N = 4871) | LIN | 1.8 | 1.2 | 33.0 | 1.8 | 1.2 | 30.0 | 1.6 | 1.1 | 25.9 |
|  | POL2 | 1.9 | 1.3 | 101.4 | 2.0 | 1.3 | 143.6 | 1.6 | 1.1 | 72.5 |
|  | POL3 | 1.9 | 1.1 | 688.6 | 2.1 | 1.2 | 526.2 | 1.8 | 1.0 | 255.7 |
|  | RPOL2 | 1.8 | 1.2 | 34.6 | 2.0 | 1.2 | 43.9 | 1.6 | 1.1 | 25.8 |
|  | RPOL3 | 1.9 | 1.2 | 79.0 | 1.9 | 1.2 | 66.3 | 1.6 | 1.1 | 37.4 |
|  | HPPCC-WCM (45.2) | 1.8 | 1.2 | 49.8 | 1.9 | 1.1 | 49.5 | 1.9 | 1.1 | 29.8 |
| Hue planes (N = 5715) | LIN | 0.8 | 0.4 | 35.5 | 0.9 | 0.4 | 32.0 | 0.7 | 0.3 | 23.4 |
|  | POL2 | 0.8 | 0.5 | 28.1 | 0.8 | 0.5 | 26.9 | 0.7 | 0.4 | 15.1 |
|  | POL3 | 0.8 | 0.5 | 29.7 | 0.8 | 0.5 | 26.2 | 0.7 | 0.3 | 16.4 |
|  | RPOL2 | 0.6 | 0.4 | 25.9 | 0.7 | 0.4 | 24.7 | 0.6 | 0.4 | 21.5 |
|  | RPOL3 | 0.5 | 0.3 | 19.1 | 0.6 | 0.3 | 14.6 | 0.5 | 0.3 | 10.9 |
|  | HPPCC-WCM (45.2) | 0.3 | 0.1 | 18.0 | 0.4 | 0.1 | 18.7 | 0.3 | 0.1 | 12.4 |

TABLE VI

INCLUDING NOISE IN THE SIMULATIONS. CIELAB
ΔE ERROR (MEAN, MEDIAN AND MAX) ON THE ESSER
CHART (TESTING) AFTER TRAINING ON MBDC DATA

| Method | D65 | | | A | | | F11 | | |
|---|---|---|---|---|---|---|---|---|---|
|  | Mean | Median | Max | Mean | Median | Max | Mean | Median | Max |
| LIN | 4.1 | 3.1 | 46.6 | 4.3 | 3.2 | 51.8 | 3.7 | 2.9 | 38.0 |
| POL2 | 3.6 | 2.6 | 51.6 | 3.9 | 2.7 | 77.6 | 3.4 | 2.5 | 40.0 |
| POL3 | 3.2 | 2.5 | 38.1 | 3.4 | 2.6 | 52.0 | 3.1 | 2.4 | 38.2 |
| RPOL2 | 3.3 | 2.4 | 37.1 | 3.6 | 2.5 | 57.1 | 3.4 | 2.4 | 37.7 |
| RPOL3 | 3.7 | 2.6 | 63.2 | 4.0 | 2.6 | 115.9 | 3.7 | 2.4 | 70.5 |
| HPPCC-WCM (45.2) | 3.3 | 2.6 | 38.7 | 3.4 | 2.6 | 42.1 | 2.9 | 2.4 | 40.1 | of freedom respectively for the POL3 and RPOL3 methods. For the MbDC data there are more patches to constrain the methods, and the LOO results suggest improved stability for the $3^{rd}$ order methods. However, results for maximum error on the Natural, and Esser charts in Tables III and V show that the $3^{rd}$ order POL and RPOL methods can produce very large errors. This may be caused by the training chart having fewer degrees of freedom than there first appears, since the reflectances are produced by a small number of pigments. It is instructive that this instability is not clear from the LOO data, which suggests that higher order polynomials are a risky choice for real situations where the training and test data differ. In contrast both the LIN and HPPCC-WCM methods show similar maximum errors across datasets and illuminants. Given that the HPPCC-WCM method uses many more degrees of freedom than LIN, this suggests that the hue-plane preserving constraint is stable for challenging training and testing sets.

B. Error Minimisation

The results for LOO testing in Tables II and IV show that in general HPPCC-WCM performs best on the MbCC data, LIN and RPOL2 marginally worse and considerably better than RPOL3, while the RPOL3 method performs marginally better than HPPCC-WCM on MbDC data. If we discount the $3^{rd}$ order polynomials based on instability on later testing sets, then HPPCC-WCM is the next best performing method on this data.

Results for separate training and test sets in Tables III and Table V show a strong data dependence. Training performance is marginally better for the HPPCC-WCM than POL2, comparable to RPOL2, and significantly better than the LIN method. For the Munsell data there is a slight advantage for POL2 and RPOL2 methods, while for the Esser chart there is an advantage for the HPPCC-WCM method (particularly for max error, and mean error on the MbDC data). Overall the performance on the Natural dataset is comparable across all methods other than the unstable POL3 and RPOL3. Finally there is a clear and strong advantage for the HPPCC-WCM method for data lying on hue planes. In all, counting number of best performances of the 4 best performing methods, HPPCC-WCM has 55, RPOL3 28, RPOL2 26 and POL3 19. A few of these are shared across methods.

C. Hue Plane Preservation

The plots in FIG. 2 show that target xy values for hue planes fall on straight lines, whereas the RPOL and POL methods introduce curvature—this violates hue-plane preservation. The RPOL method at least imposes the same curvature across different luminances, where the POL method does not. While both the LIN and and HPPCC-WCM methods preserve hue-planes, there is some error in the transform. These demonstrations support the theory in Section III and error statistics in Tables III and V, in suggesting that the HPPPC-WCM method is more applicable to real-life camera characterisation where color accuracy is required for 3D objects.

D. Noise

The results in Table VI show that the method is stable in the presence of noise, with a reduction in performance that parallels other methods. The mean error on the Esser chart is still the lower for HPPCC-WCM than for other methods.

VIII. Conclusion

This paper proposes a novel color camera characterisation termed HPPCC-WCM with the aim of increasing the number of degrees of freedom available to the transformation, while constraining the transformation to hue-plane preservation. Taken together, the numerical results, demonstrations, and theoretical arguments show that the HPPCC-WCM method combines the stability of the low order linear method with the significantly higher accuracy of the best stable high order polynomial methods whilst retaining outstanding accuracy and stability in the saturated colors. The HPPCC-WCM thus outperforms the existing state of the art on challenging reflectance datasets.

REFERENCES

[1] T. Johnson, "Methods for characterizing colour scanners and digital cameras," *Displays*, vol. 16, pp. 183-191, 1996.
[2] G. Wyszecki and W. S. Styles. Color Science: Concepts and Methods, Quantative Data and Formulae. John Wiley and Sons, N Y, 1982.
[3] P. Green and L. W. MacDonald, editors. Color engineering: achieving device independent color. Wiley, 2002.
[4] R. T. D. Luther. Aus dem Gebiet der Farbreizmetric. Zeitschrift für technische Physic, 8:540-555, 1927.
[5] H. E. Ives. The transformation of color-mixture equations from one system to another. J. Franklin Inst., 16:673-701, 1915.
[6] B. Wandell. Foundations of Vision. Sinauer Associates, Inc, 1995.
[7] G. D. Finlayson and M. Drew. Constrained least-squares regression in color spaces. Journal of Electronic Imaging, 6(4):484-493, 1997.
[8] Cheung, V. and Westland, S. and Connah, D. and Ripamonti, C. A Comparative Stydy of the Characterization of Colour Cameras by Means of Neural Networks and Polynomial Transforms. Coloration Technology, 120, 19-25, 2003.
[9] M. J. Vrhel. Mathematical methods of color correction. PhD thesis, North Carolina State University, Department of Electrical and Computer Engineering, 1993.
[10] R. S. Berns and M. J. Shyu. Colorimetric characterization of a desktop drum scanner using a spectral model. J. Electronic Imaging, 4:360-372, 1995.
[11] Guowei Hong, M. Ronnier Luo, and Peter A. Rhodes. A study of digital camera characterisation based on polynomial modelling. Color research and application, 26(1): 76-84, 2001.
[12] H.R. Kang. Colour scanner calibration. Journal of Imaging Science and Technology, 36:162-170, 1992.
[13] S. H. Lim and A. Silverstein. Spatially varying colour correction matrices for reduced noise. Technical Report HPL-2004-99, Imaging Systems Laboratory, HP Laboratories, Palo Alto, Calif., US, June 2004.
[14] H.R. Kang and P. G. Anderson. Neural network application to the color scanner and printer calibration. J. Electronic Imaging, 1:125-134, 1992.
[15] T. L. V. Cheung and S. Westland. Color camera characterisation using artificial neural networks. In IST/SID Tenth Color Imaging Conference, volume 4, pages 117-120, 2002.
[16] Li Xinwu. A new color correction model based on bp neural network. Advances in Information Sciences and Service Sciences, 3(5):72-78, 2011.
[17] P. C. Hung. Colorimetric calibration in electronic imaging devices using a look-up tables model and interpolations. Journal of Electronic Imaging, 2(1):53-61, 1993.
[18] J. Vazquez-Corral and D. Connah and M. Bertalmo. Perceptual Color Characterization of Cameras. Sensors, vol. 14, no. 12, 23205-23229, 2014.
[19] R. W. G. Hunt and M. R. Pointer. Measuring Color. Wiley, fourth edition, 2011.
[20] P. L. Vora and C. Herley. Trade-offs between color saturation and noise sensitivity in image sensors. Proceedings of the 1998 IEEE International Conference on Image Processing (ICIP-98), pp 196-200, 1998.
[21] G. Finlayson, M. Mackiewicz, and A. Hurlbert. Colour correction using root-polynomial regression. IEEE Trans. Image Processing, 24(5):1460-1470, 2015.
[22] Gaurav Sharma ed. Digital Color Imaging Handbook. CRC Press, first edition, 2003.
[23] Bui Tuong Phong. Illumination for computer generated pictures. Communications of ACM, 18.
[24] J. D. Foley, A. van Dam, S. K. Feiner, and J. F. Hughes, *Computer Graphics, principles and practice,* 2nd ed. Addison-Wesley, 1996.
[25] P. Royston and D. G. Altman. Regression using fractional polynomials of continouos covariates: Parsimonious parametric modelling. Coloration Technology, Number 120, pages 19-25, November 2003. Appl. Statist., vol. 43, no. 3, pp. 429-467, 1994.
[26] C. F. Andersen and J. Y. Hardeberg. Colorimetric characterization of digital cameras preserving hue planes. In Proceedings of the 13th Color and Imaging Conference (CIC), pages 141-146, 2005.
[27] A. Laratta and F. Zironi. Computation of Lagrange Multipliers for Linear Least Squares Problems with Equality Constraints. Computing, Number 67, pages 335-350, 2001 Springer Verlag, 2001
[28] J. P. S. Parkkinen, and S. Hallikainen and T. Jaaskelainen. Characteristic spectra of Munsell colors. Journal of the Optical Society of America-A, vol. 6, no. 2, pp. 318-322, 1989.
[29] D. H. Foster and K. Amano and S. M. C. Nascimento and M. J. Foster. Frequency of metamerism in natural to scenes. Journal of the Optical Society of America A, vol. 23, pp. 2359-2372, 2006.
[30] G. C. Hoist. CCD arrays, cameras, and displays. SPIE Press, 2nd edition, 1998.
[31] J. Jiang and D. Liu and J. Gu and Susstrunk, S. What is the Space of Spectral Sensitivity Functions for Digital Color Cameras? Proceedings of the 2013 IEEE Workshop on Applications of Computer Vision (WACV); IEEE Computer Society, pp. 168-179, 2013.
[32] L. W. MacDonald and W. Ji. Color Characterisation of a High-Resolution Digital Camera. In Proc. of the First European Conference on Color in Graphics, CGIV 2002, pp. 433-437, 2002.

The invention claimed is:

1. A method for performing a three dimensional, hue-plane preserving and differentiable quasi-linear transformation on a given color with first color space R,G,B color channel values by using N 3 by 3 training color matrices defined by a set of N+1 different training colors of which the white color is neutral and the remaining N training colors are chromatic training colors; said method comprising the steps of
   i) providing first color space R,G,B color channel values for said given color;
   ii) calculating a first color space hue-angles for said first color space R,G,B color channel values for said given color provided in step i),
   iii) generating a first color space hue-angle specific 3 by 3 matrix capable of transforming said first color space R,G,B color channel values for said given color to second color space estimated X,Y,Z color channel values for said given color; and
   iv) transforming said first color space R,G,B color channel values for said given color to second color space estimated X,Y,Z color channel values for said given color by multiplying a first color space hue-angle specific 3 by 3 matrix for said given color with said first color space R,G,B color channel values for said given color;
   wherein said first color space hue-angle specific 3 by 3 matrix is a weighted, first color space hue-angle specific sum of the N training color matrices;
   wherein said first color space hue-angle specific 3 by 3 matrix is specific for the hue angle of said first color space R,G,B color channel values for said given color provided in step i);
   v) calculating, for each training color, the weight on each of said N training color matrices, as a parameter set dependent differentiable function of the minimum hue-angle difference between the first color space hue-angle of said given color and the first color space hue-angle of the training color for which the training color matrix is specific;
   vi) obtaining a weighted, first color space hue-angle specific sum by dividing the weight of individual training color matrices with the sum of the weights of all training color matrices; and
   vii) optimizing the set of parameters of the said parameter dependent differentiable function for global accuracy of the transformation of first color space R,G,B color channel values to estimated second color space X,Y,Z color channel values by minimizing the sum of the distances between estimated and known second color space X,Y,Z color channel values from a predetermined training set of known training color channel values.

2. A three dimensional, hue-plane preserving and differentiable quasi-linear transformation method of color correction of i) three independent, linear color channel values R,G,B in a first color space to ii) three, estimated, independent color channel values X,Y Z in a second color space, said method comprising the steps of
   a) providing N 3 by 3 training color matrices by
      i) providing a predetermined training color set defined by a set of N+1 different training colors of which the white color is neutral and the remaining N training colors are chromatic training colors;
         wherein said training color set comprises N+1 known R,G,B color channel values in the first color space, and N+1 corresponding, known X,Y,Z color channel values in the second color space;
         wherein each of the N different chromatic training colors and the neutral white color contributes to the definition of a 3 by 3 training color matrix;
         wherein each training color matrix is specific for a chromatic training color;
         wherein each training color matrix is specific for the white color;
         wherein each of the N 3 by 3 training color matrices is obtained by performing a linear least squares regression constrained to both white point preservation and training color preservation;
         wherein the chromatic training color and the white color for which a training color matrix is specific is preserved in said constrained linear least squares regression;
         wherein the distance between the estimated color channel values X,Y,Z in the second color space, and the known color channel values X,Y,Z in the second color space, is minimized for each of the N training color matrices by performing, for each of the remaining, chromatic training colors, for which a training color matrix is not specific, said constrained linear least squares regression;
         wherein each training color is specific for a first color space training color hue-angle measured in the first color space, and specific for a second color space training color hue-angle measured in the second color space;
   b) using said N 3 by 3 training color matrices for performing a three dimensional, hue-plane preserving and differentiable quasi-linear transformation on a given color with first color space R,G,B color channel values by
      i) providing first color space R,G,B color channel values for said given color;
      ii) calculating first color space hue-angles for said first color space R,G,B color channel values for said given color provided in step i),
      iii) generating a first color space hue-angle specific 3 by 3 matrix capable of transforming said first color space R,G,B color channel values for said given color to second color space estimated X,Y,Z color channel values for said given color; and
      iv) transforming said first color space R,G,B color channel values for said given color to second color space estimated X,Y,Z color channel values for said given color by multiplying a first color space hue-angle specific 3 by 3 matrix for said given color with said first color space R,G,B color channel values for said given color;
      wherein said first color space hue-angle specific 3 by 3 matrix is a weighted, first color space hue-angle specific sum of the N training color matrices;
      wherein said first color space hue-angle specific 3 by 3 matrix is specific for the hue angle of said first color space R,G,B color channel values for said given color provided in step i);
      wherein the weight on each of said N training color matrices is calculated, for each training color, as a parameter set dependent differentiable function of the minimum hue-angle difference between the first color space hue-angle of said given color and the first color space hue-angle of the training color for which the training color matrix is specific;
      wherein the weighted, first color space hue-angle specific sum is obtained by dividing the weight of individual training color matrices with the sum of the weights of all training color matrices;

wherein the set of parameters for said parameter dependent differentiable function are optimized for global accuracy of the transformation of first color space R,G,B color channel values to estimated second color space X,Y,Z color channel values by minimizing the sum of the distances between estimated and known second color space X,Y,Z color channel values from a predetermined training set of known training color channel values;

c) testing a predetermined color set of M different testing colors by
  i) providing a predetermined testing color set defined by a set of M different testing color channel values;
  ii) providing M known R,G,B color channel values in a first color space and M corresponding, known X,Y,Z color channel values in a second color space;
  iii) generating estimated X,Y,Z color channel values in the second color space for each of the known R,G,B color channel values in the first color space by applying the three dimensional, hue-plane preserving and differentiable quasi-linear transformation of step b);

wherein a distance, if any, between each of the estimated X,Y,Z color channel values in the second color space, and each of the corresponding known X,Y,Z color channel values in the second color space, is a measure of the accuracy of the three dimensional, hue-plane preserving and differentiable quasi-linear transformation;

wherein a smaller distance between estimated X,Y,Z color channel values in the second color space, and corresponding known X,Y,Z color channel values in the second color space, correlates positively with a higher accuracy of the three dimensional, hue-plane preserving and differentiable quasi-linear transformation.

3. The method of claim 1, wherein the estimated X,Y,Z color channel values in the second color space are converted to estimated color channel values in a further color space, and wherein the corresponding known X,Y,Z color channel values in the second color space are converted to known color channel values in said further color space, and wherein the distances are distances between converted estimated color channel values in the further color space, and converted known color channel values in said further color space.

4. The method of claim 3, wherein said distances are converted to color differences for further evaluation of the accuracy of the transformation.

5. The method of claim 3, wherein smaller perceptual color distances, evaluated as average, median and maximum values, are evidence of a more accurate transformation.

6. The method of claim 1, wherein said distances are measured as the sum of N euclidian distances between estimated second color space X,Y,Z color channel values, and known second color space X,Y,Z color channel values.

7. The method of claim 1, wherein said parameter set dependent differentiable function is a power function of power p.

8. The method of claim 1, wherein said parameter set dependent differentiable function is a polynomial of order n with n+1 coefficients.

9. The method of claim 1, wherein a color space is a 3 dimensional euclidian space spanned by three vectors of either R,G,B color channel values or X,Y,Z color channel values.

10. The method of claim 1, wherein the hue-angle of a chromatic color is defined in chromaticity space as the angle between an arbitrary and fixed half-line emanating from the chromaticity point of the neutral, white color to the half-line emanating from neutral, white color to the chromaticity point of said chromatic color.

11. The method of claim 1, wherein hue-plane preservation comprises retainment in said transformation of all additive combinations of colors on hue-planes.

12. The method of claim 11, wherein hue-planes of a first color space defined as half-planes spanned by a vector representing a chromatic color, and a vector representing the neutral white color, are transformed to corresponding hue-planes in a second color space defined as half-planes spanned by a vector representing estimated second device color channel values of said chromatic color, and a vector representing second device color channel values of said neutral white color.

13. The method of claim 11, wherein additive combinations of colors on hue-planes are identical to the additive combinations of the spectral reflectance functions of the respective colors.

14. The method of claim 13, wherein a spectral reflectance function is expressed as a linear combination of a spectral reflection function of the white color and a spectral reflectance function of a chromatic color.

15. A hue-plane preserving color correction by weighted constrained matrixing method performed on a test color with known test set first color space R,G,B color channel values, and corresponding test set second color space X,Y,Z color channel values, said method comprising the steps of
  i) providing N training color matrices;
  ii) providing N corresponding first color space training color hue-angles for the N training color matrices provided in step i);
  iii) providing parameters for a parameter dependent and hue-angle dependent differentiable weighting function;
  iv) providing white balanced first color space color values for a color;
  v) calculating, for said color, a first color space color hue-angle for said first color space color values;
  vi) obtaining a first color space color hue-angle for said color;
  vii) calculating a weight for each of the training color matrices pertaining to said color;
  viii) obtaining N training color matrix weights for said color;
  ix) calculating, for said color, a hue-angle specific transformation matrix by adding together N weighted training color matrices calculated by multiplying each of the training color matrices with a corresponding normalized weight by applying a hue-angle specific 3 by 3 transformation matrix for a given color to said first color space R,G,B color channel values by matrix multiplication; thereby
  x) obtaining estimated white balanced second color space X_estim, Y_estim, Z_estim color channel values for said one or more colors; said method comprising the further steps of
  xi) providing known test set second color space X,Y,Z color channel values;
  xii) calculating perceptual color differences for each of the colors of the test set pertaining to the second color space X,Y,Z color channel values, and the second color space estimated X_estim, Y_estim, Z_estim color channel values, by transformation of said known and estimated second color space X,Y,Z and X_estim, Y_estim, Z_estim color channel values, respectively, into a further color space in which geometrical distance is a measure of perceptual difference; thereby xiii) obtaining a set of estimated test set color differences.

16. The method of claim 15, wherein the estimated X,Y,Z color channel values in the second color space are converted to estimated color channel values in said further color space, and wherein the corresponding known X,Y,Z color channel values in the second color space are converted to known color channel values in said further color space, and wherein the distances are distances between converted estimated color channel values in the further color space, and converted known color channel values in said further color space.

17. The method of claim 15, wherein a color space is a 3 dimensional euclidian space spanned by three vectors of either R,G,B color channel values or X,Y,Z color channel values.

18. The method of claim 15, wherein the hue-angle of a chromatic color is defined in chromaticity space as the angle between an arbitrary and fixed half-line emanating from the chromaticity point of the neutral, white color to the half-line emanating from neutral, white color to the chromaticity point of said chromatic color.

19. The method of claim 15, wherein the hue-plane preservation comprises retainment in said transformation of all additive combinations of colors on hue-planes.

20. The method of claim 19, wherein hue-planes of the first color space defined as half-planes spanned by a vector representing a chromatic color, and a vector representing the neutral white color, are transformed to corresponding hue-planes in the second color space defined as half-planes spanned by a vector representing the estimated second device color channel values of the said chromatic color, and a vector representing the second device color channel values of the said neutral white color.

21. The method of claim 19, wherein additive combinations of colors on hue-planes are identical to the additive combinations of the spectral reflectance functions of the respective colors.

22. The method of claim 21, wherein a spectral reflectance function is expressed as a linear combination of a spectral reflection function of the white color and a spectral reflectance function of a chromatic color.

23. A computer program stored on a non-transitory computer readable medium, wherein the computer program comprises computer executable program code configured to cause an image processing device, when executing said program code, to perform the method of claim 1.

24. A digital camera module configured to provide and process image data defined by first color space R,G,B color channel values; said digital camera comprising
  i) at least one processor; and
  ii) at least one memory module comprising a computer executable program code,
  wherein said at least one processor and said at least one memory module comprising said computer executable program code is configured to execute a three dimensional, hue-plane preserving and differentiable quasi-linear transformation on a given color with first color space R,G,B color channel values by using N 3 by 3 training color matrices defined by a set of N+1 different training colors of which the white color is neutral and the remaining N training colors are chromatic training colors.

25. The method of claim 1, wherein said parameter set dependent differentiable function is trigonometric function.

26. The method of claim 1, wherein said parameter set dependent differentiable function is an exponential function.

27. The method of claim 1, wherein the optimization of the parameters of said parameters dependent differential function is performed by using a subset of a training color set used for the generation of the training color matrices and using the remaining colors of said training color set for optimization.

28. The method of claim 1, wherein an image norm is used for measuring the distances between estimated second color space X,Y,Z color channel values, and known second color space X,Y,Z color channel values.

29. The method of claim 1, wherein first color channel values are white balanced to unit values in the white color for each color channel by dividing all color channel values with the color value of the white of the first color space.

30. The method of claim 1, wherein a known, synthetic color formation of a color channel value for a colored surface having a relative spectral power distribution is calculated by integration of known spectral sensitivities per device channel multiplied by said relative spectral power distribution of said surface.

31. The method of claim 30, wherein said relative spectral power distribution is equal to the spectral reflection function of the surface multiplied with the relative spectral power distribution of the illuminant.

32. The method of claim 10, wherein the chromaticity space is a 2 dimensional space formed by a central projection of R,G,B first color space values onto a plane with chromaticity values on a first axis r calculated by r=R/(R+G+B) and a second axis g calculated by g=G/(R+G+B) forming a chromaticity point (r,g) for said chromatic color.

33. The method of claim 2, wherein said parameter set dependent differentiable function is a power function of power p.

34. The method of claim 2, wherein said parameter set dependent differentiable function is a polynomial of order n with n+1 coefficients.

35. The method of claim 2, wherein said parameter set dependent differentiable function is trigonometric function.

36. The method of claim 2, wherein said parameter set dependent differentiable function is an exponential function.

37. The method of claim 2, wherein a color space is a 3 dimensional euclidian space spanned by three vectors of either R,G,B color channel values or X,Y,Z color channel values.

38. The method of claim 2, wherein the hue-angle of a chromatic color is defined in chromaticity space as the angle between an arbitrary and fixed half-line emanating from the chromaticity point of the neutral, white color to the half-line emanating from neutral, white color to the chromaticity point of said chromatic color.

39. The method of claim 2, wherein hue-plane preservation comprises retainment in the said transformation of all additive combinations of colors on hue-planes.

40. The method of claim 39, wherein hue-planes of a first color space defined as half-planes spanned by a vector representing a chromatic color, and a vector representing the neutral white color, are transformed to corresponding hue-planes in a second color space defined as half-planes spanned by a vector representing estimated second device color channel values of said chromatic color, and a vector representing second device color channel values of said neutral white color.

41. The method of claim 39, wherein additive combinations of colors on hue-planes are identical to the additive combinations of the spectral reflectance functions of the respective colors.

42. A digital camera module configured to provide and process image data defined by first color space R,G,B color channel values; said digital camera comprising
  iii) at least one processor; and
  iv) at least one memory module comprising a computer executable program code,
  wherein said at least one processor and said at least one memory module comprising said computer executable program code is configured to execute a three dimensional, hue-plane preserving and differentiable quasi-linear transformation on a given color with first color space R,G,B color channel values by using N 3 by 3 training color matrices defined by a set of N+1 different training colors of which the white color is neutral and the remaining N training colors are chromatic training colors, wherein said computer executable program code is configured to execute a hue-plane preserving color correction weighted constrained matrixing color correction method on a test color with known test set first color space R,G,B color channel values, and corresponding test set second color space X,Y,Z color channel values according to claim 1.

* * * * *